(12) United States Patent
Miyano

(10) Patent No.: US 6,727,942 B1
(45) Date of Patent: Apr. 27, 2004

(54) AUTO WHITE BALANCE APPARATUS

(75) Inventor: Toshiki Miyano, Yokohama (JP)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/391,007

(22) Filed: Sep. 7, 1999

(30) Foreign Application Priority Data

Sep. 11, 1998 (JP) .......................................... 10-257723

(51) Int. Cl.[7] ................................................. H04N 9/73
(52) U.S. Cl. .................................................... 348/223.1
(58) Field of Search ........................... 348/225.1, 223.1, 348/655; 358/516

(56) References Cited

U.S. PATENT DOCUMENTS

| | | | | |
|---|---|---|---|---|
| 4,047,202 A | * | 9/1977 | Poetsch ....................... | 348/655 |
| 5,177,599 A | * | 1/1993 | Takagi et al. ............. | 348/228.1 |
| 5,270,802 A | * | 12/1993 | Takagi et al. ............. | 348/223.1 |
| 5,282,022 A | * | 1/1994 | Haruki et al. ............ | 348/223.1 |
| 5,283,635 A | * | 2/1994 | Suzuki et al. ............... | 348/655 |
| 5,319,449 A | | 6/1994 | Saito et al. | |
| 5,644,358 A | * | 7/1997 | Miyano et al. .......... | 348/223.1 |
| 5,659,357 A | * | 8/1997 | Miyano .................... | 348/223.1 |
| 5,691,772 A | * | 11/1997 | Suzuki ..................... | 348/223.1 |

FOREIGN PATENT DOCUMENTS

| | | | | |
|---|---|---|---|---|
| JP | 5-292533 | | 5/1993 | |
| JP | 07143513 | * | 6/1995 | ............ H04N/9/73 |

* cited by examiner

Primary Examiner—Wendy R. Garber
Assistant Examiner—Jason Whipkey
(74) Attorney, Agent, or Firm—Pamela R. Crocker

(57) ABSTRACT

A brightness threshold value calculation unit figures out a brightness threshold value on the basis of a brightness average value of all blocks and the brightness of a maximum brightness block determined by a maximum brightness block search unit. Block average value calculation units extract blocks corresponding thereto and find average values of representative values of the extracted blocks. At that time, subjects of extraction by the block average value calculation units are limited to blocks having a higher brightness than the brightness threshold value among all the blocks. A white balance gain is then determined from the thus obtained block average values. This configuration achieves a white balance which responds better to light sources since the white balance gain is not affected by values of dark blocks which are considered not to well reflect the color of light from the light sources.

20 Claims, 9 Drawing Sheets

650

| G | R | G | R | G | R | G | R | G | R |
|---|---|---|---|---|---|---|---|---|---|
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |
| G | R | G | R | G | R | G | R | G | R |
| B | G | B | G | B | G | B | G | B | G |

AUTO WHITE BALANCE APPARATUS

FIELD OF THE INVENTION

The present invention relates to auto white balance used in electronics still cameras video cameras.

BACKGROUND OF THE INVENTION

To reproduce a white subject so as to look white, auto white balance control is provided in video cameras or digital still cameras. Well known as the conventional auto white balance method is the type of controlling the balance of RGB components (the three primary color components of red, green and blue) of each pixel signal in such a manner that the average of the entire image results in an achromatic color. However, this method suffered from a deficiency that improper white balance control may often be made in case chromatic colors occupy most regions of the image.

Such an improper white balance control is called a color failure. Known as an auto white balance control method to relieve this color failure is a technique disclosed in Japanese Patent Laid-open Pub. No. Hei 5-292533. This technique splits an image into a plurality of blocks, figures out an average value of RGB of each block, and extracts only the blocks of which average values belong to a predetermined range. The control of the RGB components is then made so that the RGB average values of the extracted blocks result in a achromatic color.

Another auto white balance method to lessen the color failure is seen in Japanese Patent Laid-open Pub. No. Hei 5-7369. This method puts limitations on the range of values of the white balance control signal to obviate the excessive white balance control.

Such methods were effective insofar as the light sources illuminating the subject were limitative, although they could not provide a good white balance control when unassumed light sources were used for illumination or when plural types of light sources were simultaneously used for illumination.

An improved auto white balance control apparatus in Japanese Patent Laid-open Pub. No. Hei 8-289314. This apparatus splits an image into a plurality of blocks and extracts a block group for which it is judged that a white subject under the fluorescent light was photographed, a block group for which it is judged that a white subject under the daylight or tungsten light was photographed, and a block group having a color close to that of the brightest block in an image. Then, the average values of RGB components are figured out for each block group so that the results are mixed with one another in accordance with a previously defined rule to obtain a value for use as the white balance control signal. This apparatus permits the white balance-signal to reflect the RGB average values of the block group having a color approximate to that of the brightest block in the image, to thereby provide a proper white balance control even under unassumed light sources or plural types of light sources.

Up until now, an apparatus is also well known which has a function to provide a fixed white balance control for the user specified light source, separately from the auto white balance control.

In Japanese Patent Laid-open Pub. No. Hei 8-289314, values of dark blocks were used to determine the average values of the block groups because the above block groups were extracted on the basis of only the colors. The color appearing as an image is influenced by both the color of an object itself and the color of the light source illuminating the object. Herein, there is a strong possibility that the dark blocks may not reflect the color of the light source, so that it may possibly cause an error to allow the dark block information to act on the auto white balance control signal. It was therefore often difficult to achieve a good white balance performance by the above conventional method allowing the dark block information to act on the control signal merely because of an approximation in color to the brightest block.

SUMMARY OF THE INVENTION

It is the object of the present invention to provide an auto white balance apparatus capable of achieving a white balance control through the extraction of only blocks which strongly reflect the color of the light source.

An auto white balance apparatus comprising:

block split means for splitting an input image into a plurality of blocks;

representative value calculation means for determining, for each split block, a representative value containing a brightness and a color difference representative of each block on the basis of color values of pixels lying within each block;

maximum brightness block search means for finding a maximum brightness block among said plurality of blocks on the basis of said representative values of said blocks;

brightness threshold value calculation means for determining a brightness threshold value on the basis of the brightness contained in said representative value of each block;

high brightness color block average value calculation means for defining a high brightness region as a region indicative of a color analogous to said representative value of said maximum brightness block in a color space on the basis of said representative value of said maximum brightness block, to extract blocks having representative values contained in said high brightness region as high brightness color blocks from blocks having a higher brightness than said brightness threshold value among said plurality of blocks, to thereby determine an average value of representative values of said high brightness color blocks thus extracted;

light source block average value calculation means provided correspondingly for each of assumed light sources, for extracting blocks having representative values contained in an associated light source region defined as a region indicative of the color of a white object under each associated light source in said color space, as light source blocks corresponding to each associated light source, from blocks having a higher brightness than said brightness threshold value among said plurality of blocks, to thereby determine an average value of representative values of associated said light source blocks thus extracted;

white balance control signal calculation means for determining a white balance control signal on the basis of an average value of representative values of said high brightness color blocks and an average value of representative values of said light source blocks for each light source; and white balance means for providing a white balance control for each pixel of said input image by use of said white balance control signal acquired by said white balance control signal calculation means.

According to this configuration, the white balance control signal is figured out on the basis of only the values of the blocks having a higher brightness than the brightness threshold value, thereby preventing the values of dark blocks having a strong possibility that the color of the light source may not be reflected from adversely affecting the white balance control signal.

In a preferred aspect of the present invention, the brightness threshold value is determined on the basis of the brightness of the maximum brightness block and the average brightness of all the blocks. This enables the brightness threshold value to vary depending on the situations of the individual images.

In another aspect of the present invention, an average value of representative values of blocks associated with each light source is modified by use of a standard value previously defined for each light source, whereby the value of each average value can come closer to the color of the light from the light source, ensuring an appropriate white balance for the color of the light from the light source.

A further aspect of the present invention further comprises means for detecting the brightness of a subject. The white balance control signal calculation means include second modification means for modifying an average value of representative values of the light source blocks associated with a light source of a type used as an indoor light source, with a weight which becomes smaller accordingly as the subject brightness is higher. The white balance control signal calculation means determine the white balance control signal by use of the modified average value. According to this aspect, it can be prevented to provide a white balance for the indoor light source when the subject brightness is high.

In a further aspect of the present invention, the block representative values are figured out by use of values of pixels except saturated pixels among pixels constituting associated blocks, whereby it is possible to obtain the representative values which are considered to well reflect the color of the light from the light source.

In a further aspect of the present invention, the average value is determined from only representative values of blocks other than blocks containing the number of saturated pixels exceeding a predetermined reference value, whereby it is possible to obtain a white balance control signal which well reflects the color of the light from the light source.

In a further aspect of the present invention, if a difference between the value of a predetermined pixel within a block and the representative value of the block exceeds a predetermined value, the representative value of the block is reduced to a predetermined ratio in the calculation of the average value of the block representative values. According to this aspect, there can be reduced the influence on the white balance control signal, of blocks which belonged to a light source region by chance as a result of the averaging processing.

In a further aspect of the present invention, upon the calculation of the average value of the block representative values, a larger weight is imparted to representative values of blocks closer to the center of a picture, to obtain an average value. This enables an appropriate white balance to be effected on the central portion of the picture which is generally considered to be important.

A further aspect of the present invention further comprises all block average value calculation means for determining an all block average value which is obtained by averaging representative values of all blocks of an input image. The white balance control signal calculation means determine the white balance control signal taking into consideration the all block average value as well. This aspect can prevent the white balance from abruptly varying depending on a slight change of the composition, by taking into consideration the all block average value which may often be closer to the color of the light from the light source.

In this aspect, if the all block average value does not belong to any light source regions, the all block average value is preferably modified to a predetermined small value, to be used for the calculation of the white balance control signal. In case the all block average value is an inappropriate value which does not reflect the color of the light from the light source, this enables the value to be less contributed to the white balance control signal.

A further aspect of the present invention further comprises means for detecting the brightness of a subject, and daylight block average value calculation means assuming the sun as a light source, the daylight block average value calculation means being one of the light source block average value calculation means. The daylight block average value calculation means reduce the dimensions of the light source region associated with daylight so as to exclude a high color temperature portion if the subject brightness is higher than a predetermined threshold value. The daylight block average value calculation means increases the dimensions of the light source region associated with the daylight so as to contain the high color temperature portion if the subject brightness is lower than the threshold value. According to this aspect, a proper white balance can automatically be applied to both the daytime blue sky scene and shade or other scene, of which color temperatures are close to each other.

In a further aspect of the present invention, upon the strobe light emission, an average value of representative values of the light source blocks assuming the sun as the light source is modified by using a previously defined strobe standard value in lieu of a standard value defined for the daylight, which result is then used for the calculation of the white balance control signal. According to this aspect, it is possible to process both the daylight and the strobe light by a common unit, which contributes to a simple apparatus configuration.

A further aspect of the present invention has a light source specification mode in which the white balance is achieved in view of only a specified light source. The white balance control signal calculation means in the light source specification mode determine the white balance control signal on the basis of only the average value of light source blocks associated with the specified light source. According to this aspect, by determining the white balance control signal on the basis of the average value of the light source blocks corresponding to the specified light source, it is possible to provide a dynamic control of the light source specified white balance depending on the situations of the scenes.

A further aspect of the present invention further comprises judging means for judging whether the illumination environment has changed between the present time and most recent time on the basis of comparison between a white balance signal acquired from an input image and a white balance signal of the most recent image; and storage means for storing acquired white balance control signals for the duration in which judgment is made that there is no change in the illumination environment. When the judgment means have judged that there is no change in the illumination environment, the white balance control signal calculation means correct the white balance control signal acquired from the input image by the use of the white balance control signals stored in the storage means and then provide it as output to the white balance means. According to this aspect, for the duration in which judgment is made that there is no change in the illumination environment, the current control signal is smoothed by the white balance control signals which have been stored so far. This eliminates any possibility that the white balance may abruptly vary as long as the illumination environment is unvaried.

In a further aspect of the present invention, the white balance control signal calculation means determine, for all previously assumed light sources, an index value indicative of a possibility that each light source is an illumination light source on the basis of each associated light source block count. If the index value is smaller than a predetermined threshold value for the all previously assumed light sources, the white balance control signal calculation means judge that the white balance control signal acquired from the input image has a low reliability, to correct the white balance control signal by use of a white balance signal which was acquired before and which has been judged to have a high reliability, to provide it as output to the white balance means. According to this aspect, when the acquired white balance control signal has a low reliability, the correction is made by use of past white balance control signals having a high reliability, with the result that it is possible to achieve a good white balance to a certain extent even in the case of difficult scenes in which less reliable white balance control signals are only acquired.

BRIEF DESCRIPTION OF THE DRAWINGS

FIG. 10 is a diagram for explaining a pixel group; and

DESCRIPTION OF THE PREFERRED EMBODIMENTS

The present invention will now be described with reference to the accompanying drawings which illustrate preferred embodiments thereof in a non-limitative manner.
[Embodiment 1]

Figure 1A:
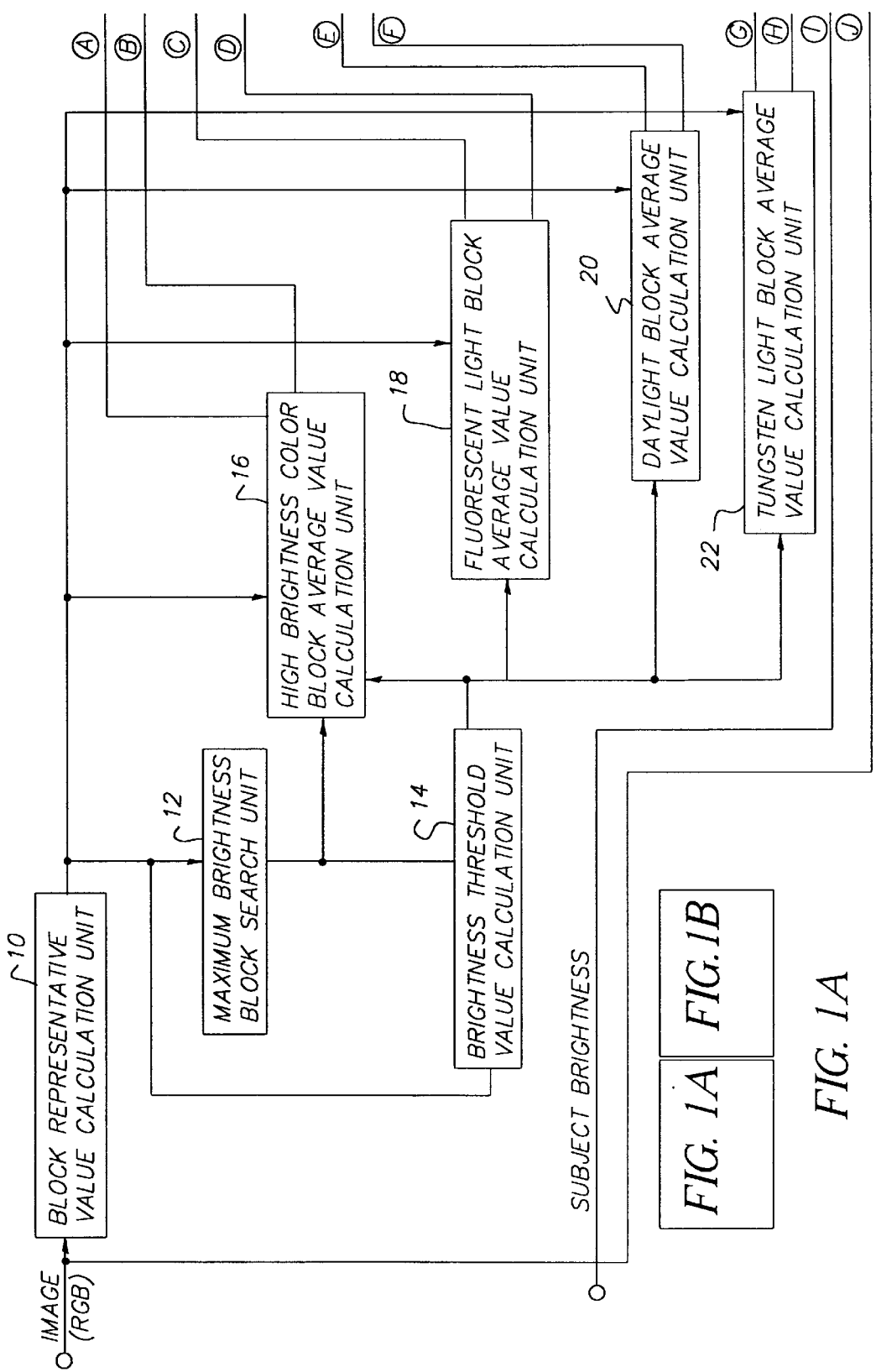
FIGS. 1A and 1B, taken together are a block diagram showing a generic configuration of an auto white balance apparatus in accordance with an embodiment of the present invention.
Figure 1B:
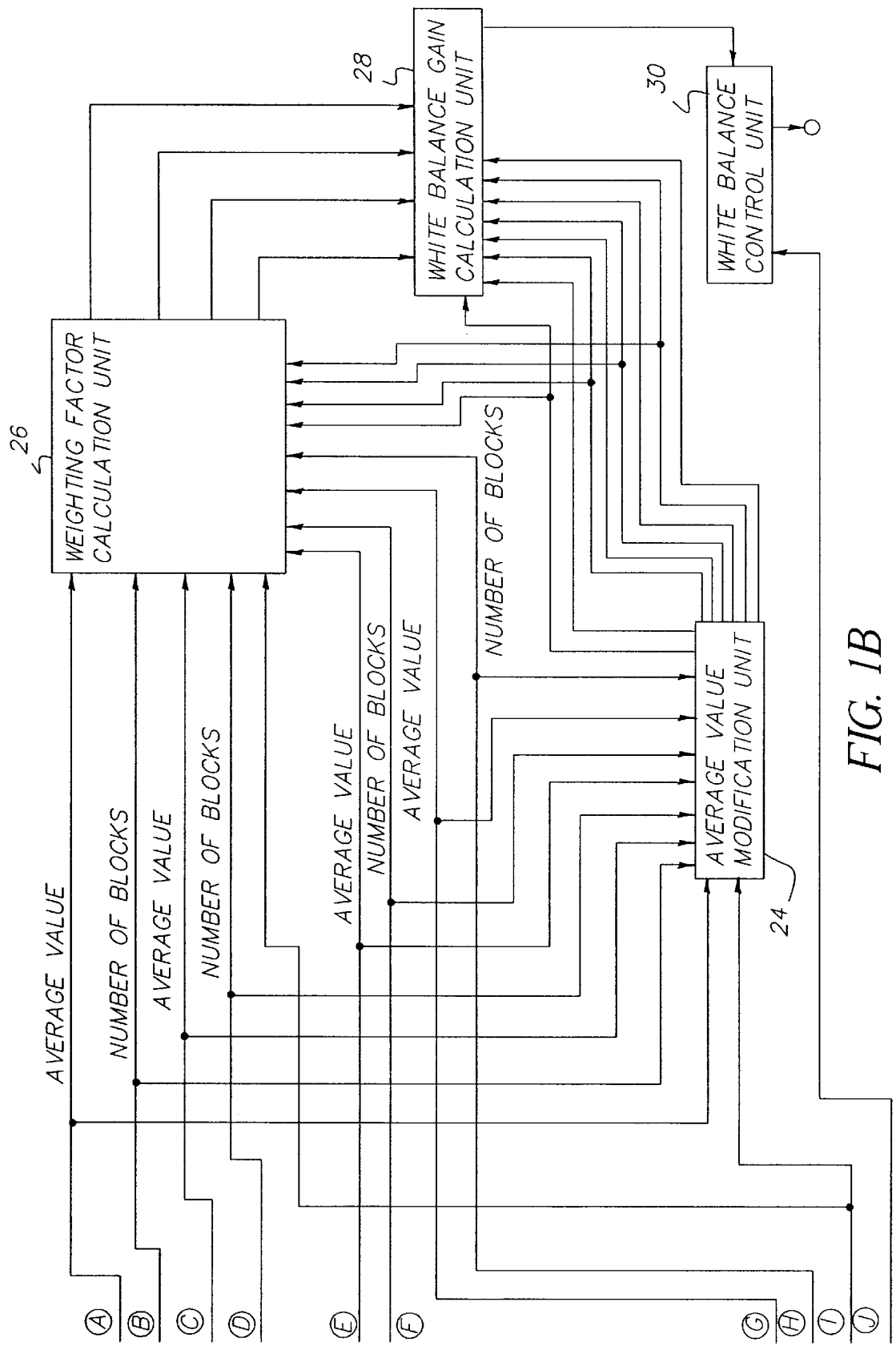

FIGS. 1A and 1B, taken together are a block diagram showing a generic configuration of an auto white balance apparatus in accordance with the present invention.

The apparatus of this embodiment serves to generate a white balance control signal from an image signal input from an imaging device not shown and provide a white balance control of the image signal using the white balance control signal. In the case of this embodiment, a color of a light source for irradiating a subject is estimated so that the white balance control signal is generated on the basis of the result of this estimation. The estimation of the color of the light source is carried out on the basis of information on image regions having colors close to high brightness colors in an image and of information on image regions having colors close to colors of various previously assumed light sources. Assumed as the light source in this embodiment are typically a fluorescent light, the sun, a tungsten light (an incandescent light), etc.

Description is hereinafter made of constituent units of this apparatus.
<Block Representative Value Calculation Unit>

Figure 2:
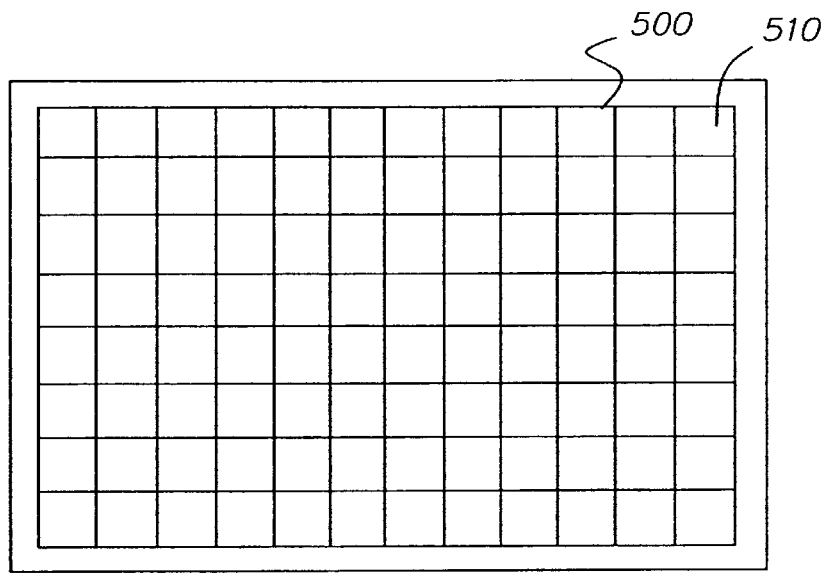
FIG. 2 illustrates an example of an image block split.

An image signal from the imaging device is input to a block representative value calculation unit 10. The block representative value calculation unit 10 splits the input image into predetermined blocks. FIG. 2 shows an example of a manner of block splitting of a screen. In this example, a single frame image 500 is equally split into a plurality of blocks 510 each consisting of n×m pixels. Then the block value calculation unit figures out a representative value of each block on a block-to-block basis. A manner of this calculation is as follows.

First, an average value (R, G, B) is found of R, G, B values of all pixels constituting each block. The average value is then subjected to the following linear transform to obtain a representative value ($T_l$, $T_g$, $T_i$).

$$\begin{pmatrix} Tl \\ Tg \\ Ti \end{pmatrix} = \begin{pmatrix} 1/4 & 1/2 & 1/4 \\ -1/4 & 1/2 & -1/4 \\ -1/2 & 0 & 1/2 \end{pmatrix} \begin{pmatrix} R \\ G \\ B \end{pmatrix} \quad \text{[Expression 1]}$$

where $T_l$ denotes a block brightness, and $T_g$ and $T_i$ denote a block color difference. It is to be noted that the matrix of the linear transform used herein is a mere example and that other matrices may naturally be used.

The thus obtained representative value of each block is input to a maximum brightness block search unit 12, a brightness threshold value calculation unit 14, a high brightness color block average value calculation unit 16, a fluorescent light block average value calculation unit 18, a daylight block average value calculation unit 20 and a tungsten light block average value calculation unit 22.
<Maximum Brightness Block Search Unit>

The maximum brightness block search unit 12 searches a block having a highest brightness T1 on the basis of data of the input representative value ($T_l$, $T_g$, $T_i$) of each block. In this search, to prevent a block including a multiplicity of saturated pixels (i.e., pixels whose R, G or B value has reached the upper limit) or an extremely dark block (having a low brightness) from being selected as the maximum brightness block, the subject of search is limited to blocks satisfying $$T_{lMin} < T_l \leq T_{lMax}$$

where $T_{lMin}$ and $T_{lMax}$ are predetermined threshold values. The blocks having a multiplicity of saturated pixels are generally provided with a high brightness, so that this condition enables them to be excluded from the subject of search.

The reason of such a limitation is as follows. The maximum brightness block is the brightest block and hence is considered to be one which well reflects the color of the light source irradiating the subject. Therefore, this embodiment uses the information on the color of the maximum brightness block as a key factor for estimating the color of the light source irradiating the subject. To this end, there is a need to select as the maximum brightness block one which well reflects the color of the light source irradiating the subject. However, since the portion exceeding the upper limit of the color value is eliminated, the saturated pixels do not represent a correct color of the subject and do not well reflect the color of the light source. Therefore, it is not appropriate to select a block including a multiplicity of such saturated pixels as the maximum brightness block. Similarly, it is inappropriate to select an extremely dark block as the maximum brightness block since it is generally considered to be one which does not well reflect the color of the light source.

From the blocks within the thus limited range, a block having the maximum $T_l$ value is selected as the maximum brightness block. Then, the maximum brightness block search unit 12 feeds a representative value ($T_{lBr0}$, $T_{gBr0}$, $T_{iBr0}$) of the thus selected maximum brightness block to both the brightness threshold value calculation unit 14 and the high brightness color block average value calculation unit 16.

<Brightness Threshold Value Calculation Unit>

The brightness threshold value calculation unit 14 figures out a brightness threshold value based on the representative value of each block input from the block representative value calculation unit 10 and on the representative value of the maximum brightness block input from the maximum brightness block search unit 12.

The brightness threshold value is a threshold value used for eliminating from the subsequent various arithmetic processes dark blocks which are considered to be ones which do not well reflect the color of the light source.

An average value $T_{lAvr}$ of the brightness $T_l$ of the blocks is figured out herein so that a brightness threshold value $T_{lThr}$ is obtained from the average value $T_{lAvr}$ and a brightness $T_{lBr0}$ of the maximum brightness block.

An example of expressions for calculating the brightness threshold value $T_{lThr}$ is given as $$T_{lThr} = P_0 * T_{lAvr} + P_1 * T_{lBr0}$$

where $P_0$ and $P_1$ denote predetermined constants which are not less than 0 but not more than 1 and which satisfy $P_0 + P_1 = 1$. In this example, the brightness threshold value $T_{lThr}$ is a value intermediate between the average brightness $T_{lAvr}$ and the brightness $T_{lBr0}$ of the maximum brightness block. The values of $P_0$ and $P_1$ are previously determined on the basis of data on images formed by use of various light sources.

It is to be appreciated that the above expression for calculating the brightness threshold value is not intended to be limitative. In any event, by determining the brightness threshold value based on the average brightness $T_{lAvr}$ of a subject image and the brightness $T_{lBr0}$ of the maximum brightness block, it is possible to determine the brightness threshold value appropriately depending on the situation of the scene so as to ensure that blocks having less possibility to reflect the color of the light source are not used in the subsequent processes.

The thus obtained brightness threshold value $T_{lThr}$ is fed respectively to the high brightness color block average value calculation unit 16, the fluorescent light block average value calculation unit 18, the daylight block average value calculation unit 20 and the tungsten light block average value calculation unit 22.

<High brightness Color Block Average Value Calculation Unit>

The high brightness color block average value calculation unit 16 receives a representative value ($T_l$, $T_g$, $T_i$) of each block, a brightness threshold value $T_{lThr}$ and a representative value ($T_{lBr0}$, $T_{gBr0}$, $T_{iBr0}$) of the maximum brightness block.

The high brightness color block average value calculation unit 16 first selects blocks having a brightness $T_l$ higher than the brightness threshold value $T_{lThr}$ from the blocks and then extracts blocks having a color difference ($T_g$, $T_i$) close to a color difference ($T_{gBr0}$, $T_{iBr0}$) of the maximum brightness block from the thus selected blocks. The thus extracted blocks are referred to as high brightness color blocks. In case the color difference ($T_g$, $T_i$) of a block is contained within a high brightness color region defined depending on the color difference ($T_{gBr0}$, $T_{iBr0}$) of the maximum brightness block, the color difference of the block is regarded as one "close" to the color difference of the maximum brightness block.

Figure 3:
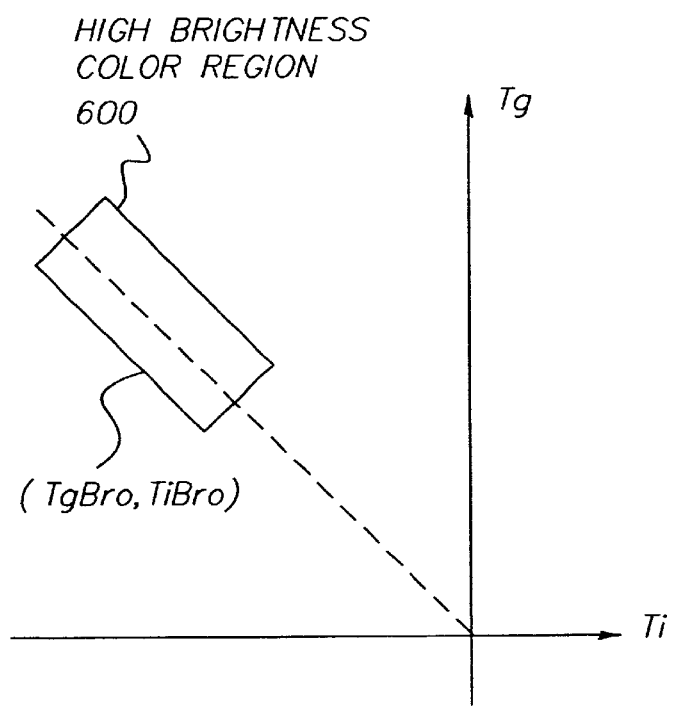
FIG. 3 illustrates an example of a high brightness color region.

FIG. 3 illustrates an example of the high brightness color region. In this example, the high brightness color region is designated at 600 and is of the shape of a rectangle having predetermined dimensions. On a $T_g$–$T_i$ plane, the region 600 extends along a straight line joining the origin and a point ($T_{gBr0}$, $T_{iBr0}$) and contains the point ($T_{gBr0}$, $T_{iBr0}$). It is natural that the shape of this region is not limited to the rectangle. In any event, the high brightness color region is determined under a certain rule on the basis of information on the color difference ($T_{gBr0}$, $T_{iBr0}$) of the maximum brightness block.

After the extraction of all the high brightness color blocks, the high brightness color block average value calculation unit 16 figures out a high brightness color block count $C_{ntBr}$ and an average value ($T_{lBr}$, $T_{gBr}$, $T_{iBr}$) of representative values of the high brightness color blocks. The thus obtained high brightness color block count $C_{ntT1}$ and high brightness color block average value ($T_{lBr}$, $T_{gBr}$, $T_{iBr}$) are fed to an average value modification unit 24 and a weighting factor calculation unit 26.

<Fluorescent Light Block Average Value Calculation Unit>

The fluorescent light block average value calculation unit 18 receives a representative value ($T_l$, $T_g$, $T_i$) of each block and a brightness threshold value $T_{lThr}$.

Figure 4:
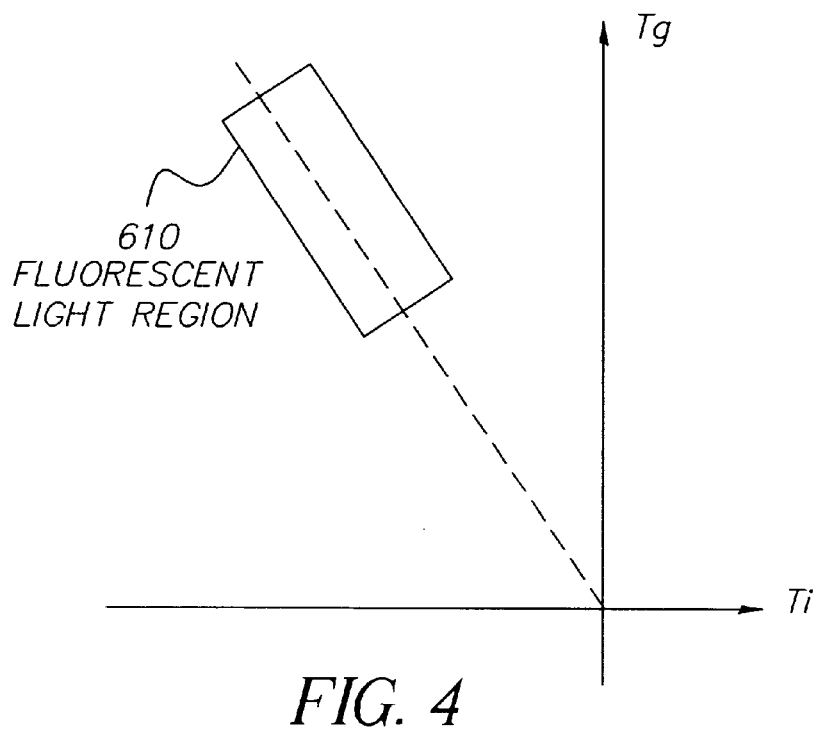
FIG. 4 illustrates an example of a fluorescent light region.

The fluorescent light block average value calculation unit 18 first selects blocks having a brightness $T_l$ higher than the brightness threshold value $T_{lThr}$ from the blocks and then extracts blocks (referred to as fluorescent light blocks) having a color close to a white object under the fluorescent light from the thus selected blocks. In case the color difference ($T_g$, $T_i$) of a block is contained within a fluorescent light region which is previously defined as a range of a color close to the color of a white object under the fluorescent light, it is judged that the color of the block is close to the color of the white object under the fluorescent light. FIG. 4 illustrates an example of the fluorescent light region which is designated at 610. The fluorescent light region 610 is previously defined on the basis of the results of collection of data obtained by photographing various white objects under various fluorescent lights.

After the extraction of all the fluorescent light blocks, the fluorescent light block average value calculation unit 18 figures out a fluorescent light block count $C_{ntFl}$ and an average value ($T_{lFl}$, $T_{gFl}$, $T_{iFl}$) (referred to as a fluorescent light block average value) of representative values of the fluorescent light blocks, both of which are fed to both the average value modification unit 24 and the weighting factor calculation unit 26.

<Daylight Block Average Value Calculation Unit>

The daylight block average value calculation unit 20 receives a representative value ($T_I$, $T_g$, $T_i$) of each block and a brightness threshold value $T_{IThr}$.

Figure 5:
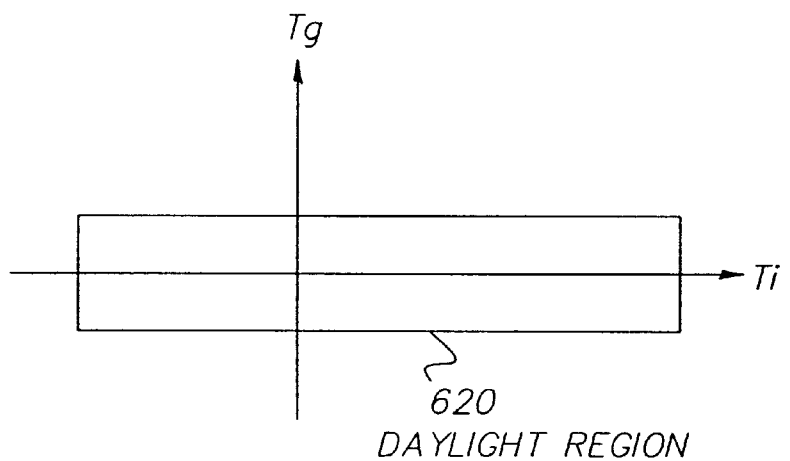
FIG. 5 illustrates an example of a daylight region.

The daylight block average value calculation unit 20 first selects blocks having a brightness $T_I$ higher than the brightness threshold value $T_{IThr}$ from the blocks and then extracts blocks (referred to as daylight blocks) having a color close to the color of a white object under the daylight from the thus selected blocks. In case the color difference ($T_g$, $T_i$) of a block is contained within a daylight region defined as a range of a color close to the color of the white object under the daylight, it is judged that the color of the block is close to the color of the white object under the daylight. FIG. 5 illustrates an example of the daylight region designated at 620. The daylight region 620 is previously defined on the basis of the results of collection of data obtained by photographing various white objects under various daylights.

After the extraction of all the daylight blocks, the daylight block average value calculation unit 20 figures out a daylight block count $C_{ntDy}$ and an average value ($T_{IDy}$, $T_{gDy}$, $T_{iDy}$) (referred to as a daylight block average value) of representative values of the daylight blocks, both of which are fed to both the average value modification unit 24 and the weighting factor calculation unit 26.

<Tungsten Light Block Average Value Calculation Unit>

The tungsten light block average value calculation unit 22 receives a representative value ($T_I$, $T_g$, $T_i$) of each block and a brightness threshold value $T_{IThr}$.

Figure 6:
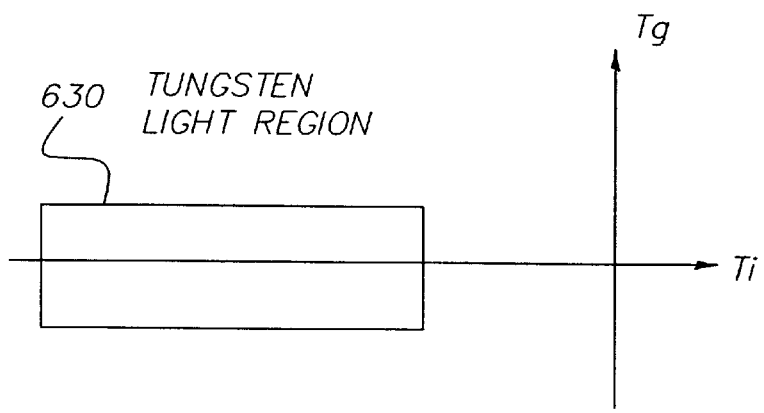
FIG. 6 illustrates an example of a tungsten light region.

The tungsten light block average value calculation unit 22 first selects blocks having a brightness $T_I$ having the brightness threshold value $T_{IThr}$ from the blocks and then extracts blocks (referred to as tungsten light blocks) having a color close to the color of a white object under the tungsten light from the thus selected blocks. In case the color difference ($T_g$, $T_i$) of a block is contained within a tungsten light region defined as a range of color close to the color of the white object under the tungsten light, it is judged that the color of the block is close to the color of the white object under the tungsten light. FIG. 6 illustrates an example of the tungsten light region designated at 630. The tungsten light region 630 is previously defined on the basis of the results of collection of data obtained by photographing various white objects under various tungsten lights.

After the extraction of all the tungsten light blocks, the tungsten light block average value calculation unit 22 figures out a tungsten light block count $C_{ntTu}$ and an average value ($T_{ITu}$, $T_{gTu}$, $T_{iTu}$) (referred to as a tungsten light block average value) of representative values of the tungsten light blocks, both of which are fed to both the average value modification unit 24 and the weighting factor calculating unit 26.

<Average Value Modification Unit>

In this embodiment, a white balance control signal (white balance gain) is generated on the basis of block average values acquired by the block average value calculation units 16 to 22 set forth hereinabove. Note that this embodiment does not directly utilize the block average values but utilizes ones modified by the average value modification unit 24 instead. This modification is made for the following two major purposes.

A first purpose is to reduce the influence of an object color contained in the block average values. The color appearing on an image is influenced by both the color of the illumination from the light source and the color of the object itself. The former is called a light source color and the latter is called the object color. White balancing is to correct the color of an image so as to allow a white one to look white in conformity with the color temperature of the illumination from the light source, so that accurate recognition of the light source color ensures ideal white balance. However, actual white balancing is carried out based on an image of a scene containing many objects of colors other than white, so that the quality of the white balance depends on the degree of accuracy of estimation of the light source color from the image information containing the object colors as well. Thus, this embodiment aims to improve the quality of white balance by subjecting the block average values acquired by the block average value calculation units 16 to 22 to the correction for relatively reducing the influence of the object colors.

A second purpose is to achieve fine white balance through the utilization of empirical knowledge of the light sources. The empirical knowledge of the light sources as used herein includes for example a fact that when the brightness of a subject is extremely high, there is a less possibility that the source of illumination is a fluorescent light.

In this embodiment, to attain the first purpose, weighted averaging is made of the block average values and standard values of the light sources corresponding thereto (i.e. predetermined typical values indicative of colors of light from the light sources) so as to increase the ratio of the light source colors in the block average values to thereby reduce the influence of the object colors.

The processing for attaining the second purpose can be performed in diverse manners depending on the type of the light sources. Therefore, individual description will be given in the following description of the modification processing for each light source.

The average value modification unit 24 modifies the block average values input from the block average value calculation units 16 to 22 so as to conform to the above purposes, on the basis of the similarly input high brightness color block count, fluorescent light block count, daylight block count and tungsten light block count as well as information on the brightness of a subject input from subject brightness detection means not shown.

Description will then be made of the block average value modification processing with respect to each light source.

(1) Modification of Fluorescent Light Block Average Value

First, the fluorescent light block average value and a previously defined fluorescent light standard value are subjected to weighted averaging. This is processing for the first purpose.

Herein, the fluorescent light standard value ($T_{gStdFl}$, $T_{iStdFl}$) is a standard value of $T_g$ and $T_i$ components of the color difference and can be grasped as one representing a typical tint of the light of the fluorescent light. This standard value is previously defined from data collected through photography of a multiplicity of scenes illuminated by the fluorescent light. Weighted averaging at a predetermined ratio is made of the color difference components $T_{gFl}$ and $T_{iFl}$ of the fluorescent light block average value ($T_{IFl}$, $T_{gFl}$, $T_{iFl}$) and the fluorescent light standard values $T_{gStdFl}$ and $T_{istdFl}$, respectively. The results $T_{gFlNew}$ and $T_{iFlNew}$ of modification through this processing are figured out as follows.

$$T_{gFlNew} = A^* T_{gFl} + B^* T_{gStdFl}$$

$$T_{iFlNew} = A^* T_{iFl} + B^* T_{iStdFl}$$

The factors A and B of the average values and the standard values, respectively, for the weighted averaging are previously defined from the photography data of a multiplicity of scenes illuminated by the fluorescent light.

The brightness component $T_{iFl}$ is not modified basically in this example, although the modification could naturally be made. For example, if a color represented by the combination with the color difference components deviates from the range representable by the RGB system, the brightness component may be adjusted so as to obviate this.

Then, the average value modification unit 24 further modifies the results of modification obtained through the above weighted averaging, using separately input information on the subject brightness. This modification is processing based on the empirical knowledge that when the subject brightness is high, there is a less possibility of being illuminated by the fluorescent light.

More specifically, when the subject brightness is fairly high, there is a strong possibility that the image is an image of an outdoor scene. Therefore, even though the block has been judged to be a fluorescent light block, it would be difficult to attribute it only to the light from the fluorescent light. Or rather, it is envisaged that it has been judged to be the fluorescent light block under the influence of the object color or others. Thus, in such a case, even though a multiplicity of fluorescent light blocks were present, the execution of the white balancing for the fluorescent light illumination might possibly bring about an unnatural color.

Figure 7:
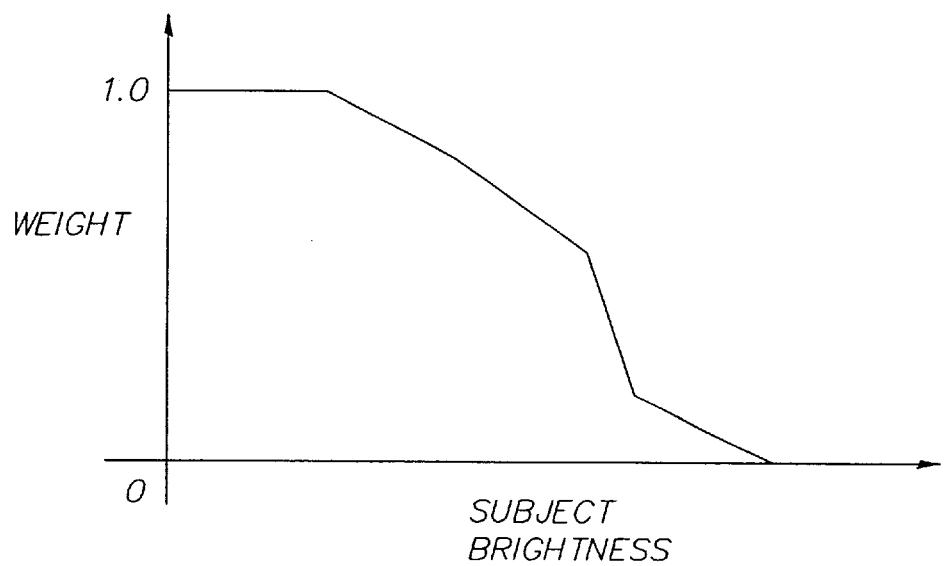
FIG. 7 illustrates an example of a weight function depending on the subject brightness, for the fluorescent light block average value.

Therefore, the fluorescent light block average value is modified herein so as to reduce the influence of the fluorescent light blocks on the white balance control signals accordingly as the subject brightness increases. More specifically, a weight function is prepared in which its weight reduces accordingly as the subject brightness increases as shown in FIG. 7 for example. Then a weight $W_{Fl}$ corresponding to a value of the subject brightness is found so that the modification results $T_{gFlNew}$ and $T_{iFlNew}$ through the above weighted averaging are multiplied by this weight to thereby update the values of the modification results $T_{gFlNew}$ and $T_{iFlNew}$. That is, $$W_{Fl} * T_{gFlNew} \rightarrow T_{gFlNew}$$

$$W_{Fl} * T_{iFlNew} \rightarrow T_{iFlNew}$$

The weight function is a function having a value equal to 1 when the subject brightness is small but having a value closer to 0 accordingly as the subject brightness increases. The weight function of FIG. 7 is merely given by way of example. In case of structuring the actual apparatus, a multiplicity of scenes are imaged while changing the weight function diversely so that an optimum weight function is found for use from the results.

It is also preferred to make a further modification on the basis of comparison between the fluorescent light block count $C_{ntFl}$ and the daylight block count $C_{ntDy}$. More specifically, in case the daylight block count is larger than the fluorescent light block count by a predetermined value, there is a strong possibility of an outdoor scene, so that additional modification is made by further multiplying the existing modification results $T_{gFlNew}$ and $T_{iFlNew}$ by a predetermined weight smaller than 1 so as to reduce the influence of the fluorescent light block average value on the white balance.

The thus updated $T_{gFlNew}$ and $T_{iFlNew}$ are final modification results in this embodiment of the color difference components of the fluorescent light block average value. According to this modification, the color difference components of the fluorescent light block average value become closer to 0 accordingly as the subject brightness increases, with the color of the fluorescent light block being closer to gray (achromatic color). Thus, the influence of the fluorescent light blocks on the white balance is suppressed as small as possible.

The thus obtained value is fed as a modified fluorescent light block average value ($T_{iFlNew}$, $T_{gFlNew}$, $T_{iFlNew}$) to both a weighting factor calculation unit 26 and a white balance gain calculation unit 28. It is to be noted that $T_{iFlNew}$ is equal to the input $T_{iFl}$ in case no modification has been made of the brightness component.

(2) Modification of Tungsten Light Block Average Value

In respect of the tungsten light block average value as well, a tungsten light standard value ($T_{gStdTu}$, $T_{iStdTu}$) of the color difference components is previously defined in the same manner as the case of the fluorescent light blocks. First, the above average value and the standard value are subjected to weighted averaging to modify the average value. The arithmetic expression is the same as that in the case of the fluorescent light blocks and hence is omitted. It is natural that values of the factors used in this calculation are separately defined for the tungsten light.

Then, the results $T_{gTuNew}$ and $T_{iTuNew}$ of modification through the weighted averaging are further subjected to the following modification by utilizing the empirical knowledge.

As is well known, the tungsten light illumination is used when attaching greater importance to "warmth" as compared with the fluorescent light. First, modification utilizing this knowledge is carried out. When attaching greater importance to "warmth", leaving a slight reddish tint, instead of performing the white balance allowing the white to look completely white, would give a good impression to the viewer. Thus, in case an image is considered to be one of a tungsten light scene which attaches greater importance to warmth, the tungsten light block average value is modified toward a slight bluish tint. That is, if the value of the $T_i$ component $T_{iTuNew}$ of the average value is smaller than a predetermined threshold value (in other words, if a reddish tint is stronger than a bluish tint; see the definition of $T_i$), it is judged that there is a strong possibility of a tungsten light scene, to increase the value of $T_{iTuNew}$ (in other words, to enhance a bluish tint). The white balancing is performed so as to allow the color to come closer to gray (achromatic color), so that the modification toward a bluish tint results in a slight increase in a reddish tint in the white balance as compared with the case of absence of such a modification.

Then, this modification result is subjected to a further modification utilizing a knowledge that a reddish tint is preferred in case of a sunset scene. That is, if it is judged that the image is indicative of a sunset scene, the tungsten light block average value is modified toward a bluish tint, allowing the white balance to result in a reddish tint. More specifically, in cases where the daylight block count $C_{ntDy}$ is larger than the tungsten block count $C_{ntTu}$ by a predetermined value and where the value of the color difference $T_{iDy}$ of the daylight block average value is negative (in other words, red is stronger than blue), it is judged that the image is one of a sunset scene, to increase the value of $T_{iTuNew}$ (in other words, to enhance a bluish tint). In case of a sunset scene, such a modification enables the tendency of color of an image to be tinged with red, adding to a sunset-like impression.

Figure 8:
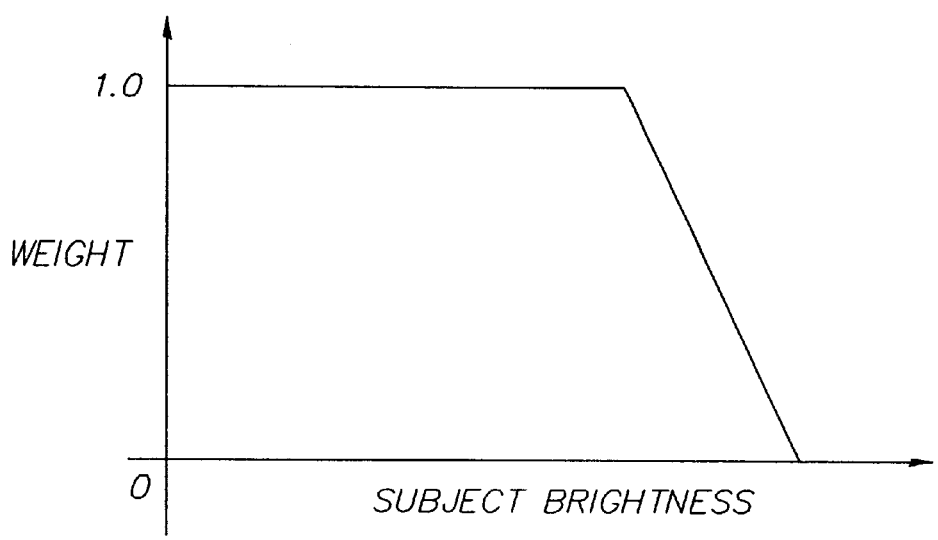
FIG. 8 illustrates an example of a weight function depending on the subject brightness, for the tungsten light block average value.

In cases where it is judged that the image is not one of a sunset scene, that is, where the criterion of judgment of the sunset scene is not satisfied, a further modification is carried out based on the subject brightness in the same manner as the case of the fluorescent light block average value, instead of the modification of the sunset scene allowing an enhancement of the bluish tint. That is, the tungsten light is generally for an indoor illumination and is often darker than the outdoor lighting, so that a higher brightness leads to a less possibility of being illuminated by the tungsten light. Modification is thus made of the tungsten light block average value so as to weaken the tint (in other words, to reduce the color difference (or to allow the color difference to come closer to 0) accordingly as the subject brightness increases. More specifically, in the same manner as the case of the fluorescent light, a weight function is prepared in which its weight reduces accordingly as the subject brightness increases as shown in FIG. 8. Then a weight $W_{Tu}$ corresponding to a value of the subject brightness is found so that the modification results $T_{gTuNew}$ and $T_{iTuNew}$ obtained through the above weighted averaging are multiplied by this weight to update the values of the modification results $T_{gTuNew}$ and $T_{iTuNew}$. This processing is effected through the same calculation as the expression (5) of the case of the fluorescent light blocks. By virtue of such a modification, the color difference components of the tungsten light block average value become closer to 0 accordingly as the subject brightness increases, making it possible to suppress the influence of the tungsten light blocks on the white balance as small as possible.

As is apparent from the above description, the modification in the case of the sunset scene and the modification based on the subject brightness are alternative.

The modification result ($T_{ITuNew}$, $T_{gTuNew}$, $T_{iTuNew}$) obtained through the above processing is fed as a modified tungsten light block average value to both the weighting factor calculation unit 26 and the white balance gain calculation unit 28. It is to be noted that $T_{ITuNew}$ is equal to the input $T_{ITu}$ in case no modification has been made of the brightness components.

(3) Modification of Daylight Block Average Value

In respect of the daylight block average value as well, a daylight standard value ($T_{gStdDy}$, $T_{iStdDy}$) of the color difference components is previously defined so that the average value and the standard value are subjected to weighted averaging to modify the average value. The arithmetic expression is the same as that in the case of the fluorescent light blocks and hence is omitted. It is natural that values of the factors used in this calculation are separately defined for the daylight.

Then, the results $T_{gDyNew}$ and $T_{iDyNew}$ of modification through the weighted averaging are further subjected to the following modification utilizing an empirical knowledge.

The knowledge used as the base herein is a knowledge that when a subject is well illuminated (in other words, when the illumination by the daylight is sufficiently strong), the image of a scene illuminated by the daylight hardly requires the white balance. That is, in such a case, a white object generally appears white without subjecting it to strong white balance. On the contrary, the white balance is generally often required in dark scenes, such as the case where the color temperature is low (the scene is tinged with red) in the shade or the case where the color temperature is high (the scene is tinged with blue) in the evening.

Figure 9:
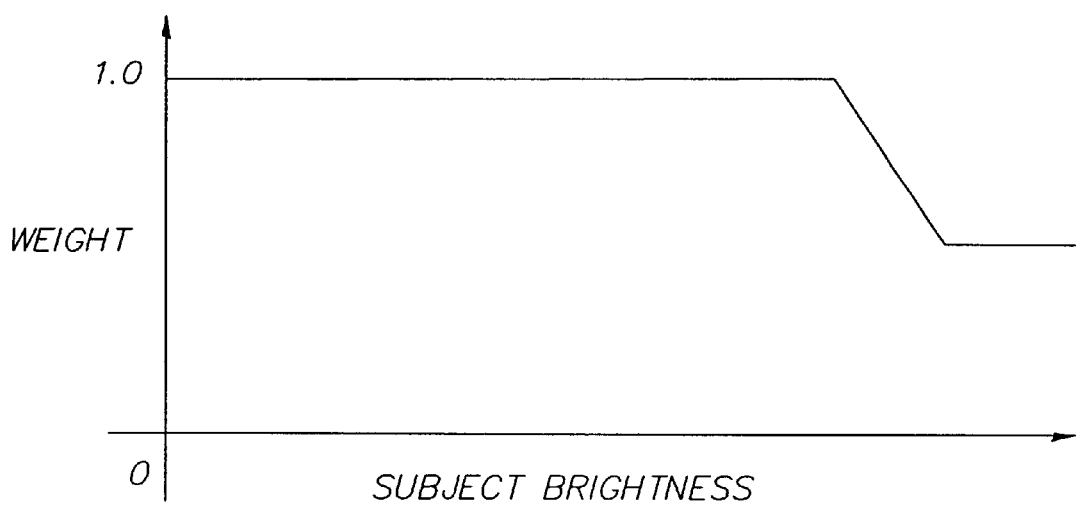
FIG. 9 illustrates an example of a weight function depending on the subject brightness, for the daylight block average value.

Based on such an empirical knowledge, this embodiment makes a modification allowing the daylight block average value to become closer to gray accordingly as the subject brightness increases. That is, a weight function is prepared as shown in FIG. 9. Then a weight $W_{Dy}$ corresponding to a value of the subject brightness is found so that the results $T_{gDyNew}$ and $T_{iDyNew}$ of modification through the above weighted averaging are multiplied by this weight to update the values of the modification results $T_{gDyNew}$ and $T_{iDyNew}$. This processing can be carried out by using the same calculation as the expression (5) in the case of the fluorescent light blocks. Such a modification enables the tint of the daylight block average value to fully act on the white balance in the event of a low subject brightness.

The modification result ($T_{iDyNew}$, $T_{gDyNew}$, $T_{iDyNew}$) obtained through the above processing is fed as a modified daylight block average value to both the weighting factor calculation unit 26 and the white balance gain calculation unit 28. Note that $T_{iDyNew}$ has the same value as that of the input $T_{iDy}$ in case no modification has been made of the brightness components.

(4) Modification of High Brightness Color Block Average Value

Depending on which light source among the fluorescent light, the sun and the tungsten light allows the tint (the color difference components ($T_{gBr}$, $T_{iBr}$)) of the high brightness color block average value to come closest to the color of a white object under the illumination thereof, the modification of the high brightness color block average value is carried out by using the same processing as the modification processing of the block average value for the light source allowing the closest tint of color.

More specifically, first, the high brightness color block average value and a previously defined standard value are weighted averaged so that the results are subjected to the processing (for example, such as multiplying the average value by a weight which becomes small accordingly as the subject brightness increases) based on an empirical knowledge. At that time, depending on which light source allows the tint of the high brightness color block average value to come closest to the color of white object under the illumination thereof, there may be varied the standard value and/or the factors for the weighted averaging or the content of the processing based on the empirical knowledge.

For example, in case it is judged that the tint of the high brightness color block average value is closest to the color of a white object under the fluorescent light, the same processing as the modification processing for the above fluorescent light block average value is applied to the high brightness color block average value. In this case, the standard value and factors for the weighted averaging may be just the same as those for the fluorescent light block average value modification, or alternatively different values having a certain relation therewith may be employed. The weight function for the subject brightness may also be the same as that for the fluorescent light block average value modification.

It is to be appreciated that the light source allowing the tint of the high brightness color block average value to come closest to the color of the white object under the illumination thereof can be determined by previously setting on a color difference ($T_g$-$T_i$) plane a region of color difference regarded to be closer for each light source (fluorescent light, sun, tungsten light), and depending on which region contains the color difference components of the high brightness color block average value.

The modification result ($T_{iBrNew}$, $T_{gBrNew}$, $T_{iBrNew}$) through the above processing is fed as a modified high brightness color block average value to both the weighting factor calculation unit 26 and the white balance gain calculation unit 28. Note that $T_{iBrNew}$ has the same value as that of the input $T_{iBr}$ in case no modification has been made of the brightness components.

The processing effected by the average value modification unit 24 has been described hereinabove. It is to be appreciated that the average value modification unit 24 feeds to the white balance gain calculation unit 28 not merely the modification result of each block average value obtained through the above processing but also the value of each block count.

<Weighting Factor Calculation Unit>

The weighting factor calculation unit 26 figures out a weighting factor of each block average value. This weighting factor is used in the white balance gain calculation unit 28 which will be described later. The white balance gain calculation unit 28 weighted averages the block average values to estimate the color of the light source illuminating a scene and obtains a white valance control signal (gain) based on the estimation, and the weight for the weighted averaging is acquired by the weighting factor calculation unit 26.

The weighting factor calculation unit 26 receives block average values and the block count from the block average calculation units 16 to 22 and receives modified block average values from the average value modification unit 24. The weighting factor calculation unit 26 further receives a subject brightness acquired by subject brightness detection means not shown.

(1) Calculation of Fluorescent Light Block Weighting Factor $W_{gtFl}$

The weighing factor $W_{gtFl}$ for the fluorescent light blocks is determined fundamentally on the basis of the subject brightness. To this end, use is made of a weight function in which its value reduces accordingly as the subject brightness increases, similar to the weight function (FIG. 7) used in the average value modification unit 24 for example. This function may be exactly the same as one used in the average value modification unit 24 or may be different one. It is preferable that the weight function varies smoothly in response to the variation of the subject brightness.

In case the product of the thus obtained weighting factor and the fluorescent light block count is less than a previously defined threshold value, it is envisaged that there is a less possibility that a scene is illuminated by the fluorescent light. Therefore, the weighting factor $W_{gtFl}$ is multiplied by a predetermined value smaller than 1 for updating.

(2) Calculation of Tungsten Light Block Weighting Factor $W_{gtTu}$

The weighting factor $W_{gtTu}$ for the tungsten light blocks is also determined fundamentally on the basis of the subject brightness, although only the case of the sunset scene uses a specific method for the determination thereof without using the subject brightness. That is, judgment is first made of whether the image represents a sunset scene. If it is judged that the sunset scene is represented, the weighting factor $W_{gtTu}$ is set to a previously defined small positive value. This enables the weighting factor of the tungsten light block average value containing a lot of reddish tints to be reduced, so that the result of the white balance of the sunset scene allows a strong tinge of red to remain.

The judgment of whether the sunset scene is represented or not can be made using the same method as described in the tungsten light block modification of the average value modification unit 24. Then, if it has been judged that the sunset scene is not represented, the weighting factor $W_{gtTu}$ is determined on the basis of the subject brightness. In this case as well, it is preferable to use a weight function in which its value gradually reduces accordingly as the subject brightness increases, similar to the one used in the average value modification unit 24 (see FIG. 8).

Then, the thus obtained weighting factor $W_{gtTu}$ is regulated in accordance with the ratio between the tungsten light and the fluorescent light in the illumination. For this regulation, in case the fluorescent light blocks are superior to the tungsten light blocks (for example, in the block count), the weighting factor $W_{gtTu}$ is multiplied by a predetermined value smaller than 1 to reduce the value of the weighting factor. No regulation is made in the other cases.

This regulation makes use of an empirical knowledge that in the case of a scene containing portions illuminated primarily by the tungsten light and portions illuminated primarily by the fluorescent light in an intermixed manner, the color of the tungsten light remaining without being corrected (the color is tinged with red in this case) imposes less unpleasant feeling on the human eyes as compared with the color of the fluorescent light remaining without being corrected (the color is tinged with green in this case).

For example, in the case of a scene where the right side is illuminated primarily by the tungsten light but the left side is illuminated primarily by the fluorescent light, an unfinished white balance will result with unnatural colors of the image on the right and left sides thereof, if it is estimated that the color of the light source is a value obtained by weighted averaging the tungsten light block average value and the fluorescent light block average value with the same weight, to perform the white balancing. As opposed to this, the execution of the above regulation will reduce such unnaturalness.

In case the product of the thus obtained weighting factor and the tungsten light block count is smaller than a previously defined threshold value, it is envisaged that there is a less possibility that the scene is illuminated by the tungsten light, so that the weighting factor $W_{gtTu}$ is multiplied by a predetermined value smaller than 1 for updating.

(3) Calculation of Daylight Block Weighting Factor $W_{gtDy}$

If the tungsten light block count $C_{ntTu}$ is larger than the daylight block count $C_{ntDy}$ by a predetermined value, then it is judged that there is a strong possibility that the image is one of a tungsten light scene, with the result that the weighting factor $W_{gtDy}$ of the daylight blocks is set to a predetermined value smaller than 1. In the other cases, it is set to 1.

(4) Calculation of High Brightness Color Block Weighting Factor $W_{gtBr}$

Depending on which light source among the fluorescent light, the sun and the tungsten light allows the color difference components ($T_{gBrNew}$, $T_{iBrNew}$) of the modified high brightness color block average value to come closest to the color of a white object under the illumination thereof, the high brightness color block weighting factor $W_{gtBr}$ is figured out by using the same method as the case of the light source allowing the closest color difference components. In this case, the light source presenting the closest color difference components can be determined by previously setting on a color difference ($T_g$–$T_i$) plane a region of color difference regarded to be closer for each light source (fluorescent light, sun, tungsten light), and depending on which region contains the color difference components of the modified high brightness color block average value. When none contain them, the weighting factor $W_{gtBr}$ is set to 1.

Each region in this case can be determined as follows for example. That is, a multiplicity of scenes are previously photographed for each light source using only illumination from the each light source in order to obtain a distribution of the color difference components of the high brightness color block average value in each scene. Then, each region is defined so as to correspond to the distribution of the high brightness color block average values for each light source.

The thus obtained weighting factor for each block is fed to the white balance gain calculation unit 28.

<White Balance Gain Calculation Unit>

The white balance gain calculation unit 28 figures out a white balance gain in the form of a white balance control signal, on the basis of a modified value of each block average value and the block count input from the average value modification unit 24 and of a weighting factor for each block input from the weighting factor calculation unit 26. Acquired as the white balance gain is a value which allows an estimation of the color of light from the light source illuminating a subject to correct this color of light into gray (achromatic color). The color of a light source illuminating the subject is determined by subjecting the block average values (modified values) to weighted averaging using the block count and the weighting factor of the associated light source. The following are expressions for calculating the white balance gain by way of example.

$Twc = WgtFl*CntFl + WgtTu*CntTu + WgtDy*CntDy + WgBr*CntBr$  [Expression 6]

$TlMix = (WgtFl*TlFlNew + WgtTu*TlTuNew + WgtDy*TlDyNew + WgtBr*TlBrNew)/Twc$ $TgMix = (WgtFl*TgFlNew + WgtTu*TgTuNew + WgtDy*TgDyNew + WgtBr*TgBrNewBr)/Twc$ $TiMix = (WgtFl*TiFlNew + WgtTu*TiTuNew + WgtDy*TiDyNew)$  [Expression 7]

$$\begin{pmatrix} RMix \\ GMix \\ BMix \end{pmatrix} = \begin{pmatrix} 1 & -1 & -1 \\ 1 & 1 & 0 \\ 1 & -1 & 1 \end{pmatrix} \begin{pmatrix} TlMix \\ TgMix \\ TiMix \end{pmatrix}$$ [Expression 8]

$MaxMix = \max(RMix, GMix, BMix)$  [Expression 9]

$Rgain = MaxMix/RMix$ $Ggain = MaxMix/GMix$ $Bgain = MaxMix/BMix$  [Expression 10]

That is, ($R_{mix}$, $G_{mix}$, $B_{mix}$) acquired through the above calculation procedure represents the color of the light source illuminating the subject. The white balance gain ($R_{gain}$, $G_{gain}$, $B_{gain}$) is defined so as to correct into gray (i.e., to be R=G=B) the color obtained when this light source color ($R_{Mix}$, $G_{Mix}$, $B_{Mix}$) has been reflected by the white object.
<White Balance Control Unit>

A white balance control unit 30 multiplies pixel values R, G and B of an image input from the imaging device by gains $R_{gain}$, $G_{gain}$ and $B_{gain}$, respectively, acquired by the white balance gain calculation unit 28, to control the white balance of the image to provide the results as its output.
<Effect of Embodiment 1>

According to the apparatus of the embodiment 1 as set forth hereinabove, it is possible to allow not merely the color (i.e., block average value) of blocks which are considered to be strongly affected by various light sources (fluorescent light, sun, etc.) but also the color of the brightest block to act on the white balance, thereby ensuring a good white balance even in the cases where the scene is illuminated by a plurality of different light sources or where it is illuminated by unassumed light sources.

Furthermore, this embodiment selects only blocks having brightness equal to or larger than a brightness threshold value which has been defined by a predetermined method, to determine a block average value as the base of the white balance from only those blocks, thereby eliminating any possibility that the white balance may be affected by the information on dark blocks which are considered not to well reflect the color of the light source, to ensure an more appropriate white balance.

Furthermore, this embodiment determines the brightness threshold value on the basis of both the brightness of the maximum brightness block and the average brightness of all the blocks, thereby making it possible to determine an appropriate brightness threshold value in accordance with various scenes.

Furthermore, this embodiment examined the characteristics of the daylight and the tungsten light and treated the sun and tungsten as different sorts of light sources. More specifically, taking into consideration a characteristic that the tungsten light has a stronger tinge of red as compared with the daylight, the daylight region 620 and the tungsten light region 630 were separately disposed in such a manner that they did not overlap each other as shown in FIGS. 5 and 6, whereby the daylight blocks and the tungsten light blocks were distinguished from each other. This ensures acquisition of a more appropriate white balance gain as compared with the prior art in which the daylight and the tungsten light were treated as a single light together.

Furthermore, this embodiment subjects the block average values corresponding to various light sources to modification for enhancing the color of each light source by use of the standard value of the each light source, thereby reducing the influence of the object color on the color of the blocks, to ensure acquisition of a more proper white balance gain.

Furthermore, taking advantage of a knowledge about the relationship between the light source and the subject brightness, this embodiment modifies each block average value in response to the subject brightness so that a more expedient white balance gain is acquired.

Furthermore, upon the search of the maximum brightness block, this embodiment excluded from the subject of search both too dark blocks which may not be well illuminated and too bright blocks which may contain a multiplicity of saturated pixels, thereby making it possible to select the maximum brightness block from the blocks which well reflect the color of the light source. Accordingly, the information on the light source acts clearly on the white balance as well.
[Embodiment 2]

This embodiment eliminates saturated pixels when determining a block representative value, to achieve a more proper white balance.

The content of processing effected in this embodiment will be described hereinbelow, taking the case of an image acquired from a CCD having a Bayer patterned color filter shown in FIG. 10. In this diagram, R, G and B represent the three primary colors.

In order to calculate the block representative value in the block representative value calculation unit 10, this embodiment splits a block into a plurality of pixel groups 650 each consisting of 2×2 pixels, that is, four pixels of G, R, B and G. Check is then made of values of pixels constituting each pixel group. If at least one of the pixels has a value larger than a previously defined threshold value $S_{atPix}$, then the values of all the pixels belonging to that pixel group are excluded from the calculation of the block representative value.

The pixel having a value larger than the threshold value $S_{atPix}$ is considered as saturated one, of which value represents by no means the value of a correct color component of an object. By excluding such a pixel from the calculation of the block representative value, it is possible to acquire a block representative value which well reflects the block color tendency. Furthermore, excluded from the calculation in this processing is not merely the saturated pixel but also the 2×2 pixel group as a unit representing the color of a point of the object (that is, including all of R, G and B), so that there can be obtained the representative value from only the points representing correct colors.

Although description has been made in this example of the case of the image acquired from the CCD having the Bayer patterned color filter, the method of this embodiment could naturally be applied to other types of images.

[Embodiment 3]

Although the embodiment 2 upon the determination of each block representative value has excluded the values of the saturated pixels from the calculation to reduce the influence of the saturated pixels, this embodiment when averaging the representative values of blocks to obtain a block average value excludes blocks containing a multiplicity of saturated pixels from the averaging calculation to thereby reduce the influence of the saturated pixels.

This embodiment defines in advance the allowable upper limit of the saturated pixels within a single block. Then, similar to the embodiment 2, the block representative value calculation unit 10 splits each block into a plurality of pixel groups each consisting of 2×2 pixels containing all the components of R, G and B. Then, on a block-to-block basis is found the number of pixel groups containing the saturated pixels (i.e., pixels having a value larger than a previously defined threshold value $S_{atPix}$). The block representative value calculation unit 10 discards the representative values of blocks in which the number of the pixel groups containing the saturated pixels has exceeded the above upper limit so as not to be provided to the subsequent steps as its output.

As a result of this, the blocks containing a multiplicity of saturated pixel are not used for the calculation of the block average value, so that it is possible to prevent any degradation in performance of the white balance attributable to the saturated pixels.

[Embodiment 4]

The method of judging the color tendency of a block from the average (i.e., representative value) of colors within the block may incur a case where in spite of the fact that colors of individual points within a block are too far from the white color under any light source, the average of the colors comes closer to white color under any light source by chance. Such a block is extracted as a block corresponding to the any light source, although there is also a strong possibility that the block may not be illuminated by that light source. Accordingly, the direct use of the representative value of such a block may possibly prevent an acquisition of a proper white balance. Thus, this embodiment provides a configuration capable of effective suppression of the occurrence of such a case.

In this embodiment, a predetermined pixel within a block is defined as a reference pixel. Comparison is then made between the color in the vicinity of the reference pixel and the color of the representative value of the block. If a difference between the two is large, the block is regarded as a "pseudo" light source block, and the representative value of the block is multiplied by a weight smaller than 1 to thereby reduce the influence on the white balance gain.

The reference pixel can be for example a central pixel of the block or a pixel whose value has most recently been read in the averaging operation for the determination of the block representative value. The latter in particular facilitates the comparison since it has a pixel value remaining in the form of data on hand at the time of completion of the calculation of the representative value.

More specifically, on a block-to-block basis, the block representative value calculation unit 10 determines a color $(R_r, G_r, B_r)$ of an image in the vicinity of the reference pixel from the values of pixels of R, G and B within a predetermined range around the reference pixel in the block. Then, by the linear transform of the expression (1), the block representative value calculation unit 10 transforms the result into brightness components and color difference components $(T_{ir}, T_{gr}, T_{ir})$ and provides them as its output together with the representative value $(T_l, T_g, T_i)$. If among the blocks extracted to obtain the average value there exists one allowing the difference between the value $(T_{ir}, T_{gr}, T_{ir})$ in the vicinity of the reference pixel and the representative value $(T_l, T_g, T_i)$ to exceed the previously defined threshold value, then the block average value calculation units 16 to 22 judge it as a pseudo light source block and impart a small weight to the representative value of this block to perform the averaging processing. The difference between the reference pixel value and the block representative value can be for example the sum square of difference for each component or the sum total of absolute values of difference for each component.

It is also preferable that with respect to the difference between the vicinity of the reference pixel and the block representative value, only the color difference components $(T_g, T_i)$ are compared with each other in disregard of the brightness component. It is also possible to judge inappropriate blocks through the mutual comparison of the R, G and B values which are not subjected to the linear transform.

According to this embodiment, in this manner, adverse effect of the pseudo light source block on the white balance gain can be reduced through relatively simple processing.

[Embodiment 5]

Depending on the scene, the central portion and peripheral portion of the picture may separately be illuminated by different light sources. An example thereof is the case where a window has been photographed from the interior of a house or other building. The interior is illuminated by the fluorescent light for example, whereas the exterior viewed through the window is illuminated by the daylight. In such a scene, if the area illuminated by the light source for the peripheral portion is larger, white balancing will be effected with the focus on the light source for the peripheral portion. In the photography, however, it is typical to compose a picture image in such a manner that the most noticeable one (subject) is centered in the picture. Thus, the white balance emphasizing the light source for the peripheral portion may pose a problem that the color of the key subject centered in the picture may possibly become unnatural. This embodiment addresses such a problem.

In this embodiment, on a picture is defined a distribution of weight which becomes larger toward the center of the picture but smaller toward the periphery thereof. When the block average value calculation units 16 to 22 determine the block average values, a weight is imparted to the representative value of each block in response to the position of that block within the picture, after which the averaging processing is carried out.

This processing enables the information on the color of the block typically having a high importance centered in a picture to act strongly on the white balance, thereby ensuring appropriate white balance of the central portion of the picture.

[Embodiment 6]

In spite of photography under the same illumination environment, a change of the photographed scene as a result of change of position or direction of the camera may result in a change of blocks to be illuminated by the light sources such as the fluorescent light and the sun, for example, a change from a fluorescent light block to a daylight block and vice versa, which may in turn bring about a large variation in the white balance. The large variation in the white balance may give a different overall impression of colors.

In order to solve such a problem, this embodiment provides a control method ensuring a performance (which is referred to as "white balance stability") that in the situation which is considered to be under the same illumination, the white balance is prevented from varying to a large extent depending on the change of the scene.

To acquire the white balance stability, this embodiment makes use of an empirical knowledge that in normal scene the total average color of the entire image is close to the color of the light source. That is, the information on the total average color of an image acts on the white balance so as to lessen a variation in the white balance gain attributable to the change of the scene.

Figure 11A:
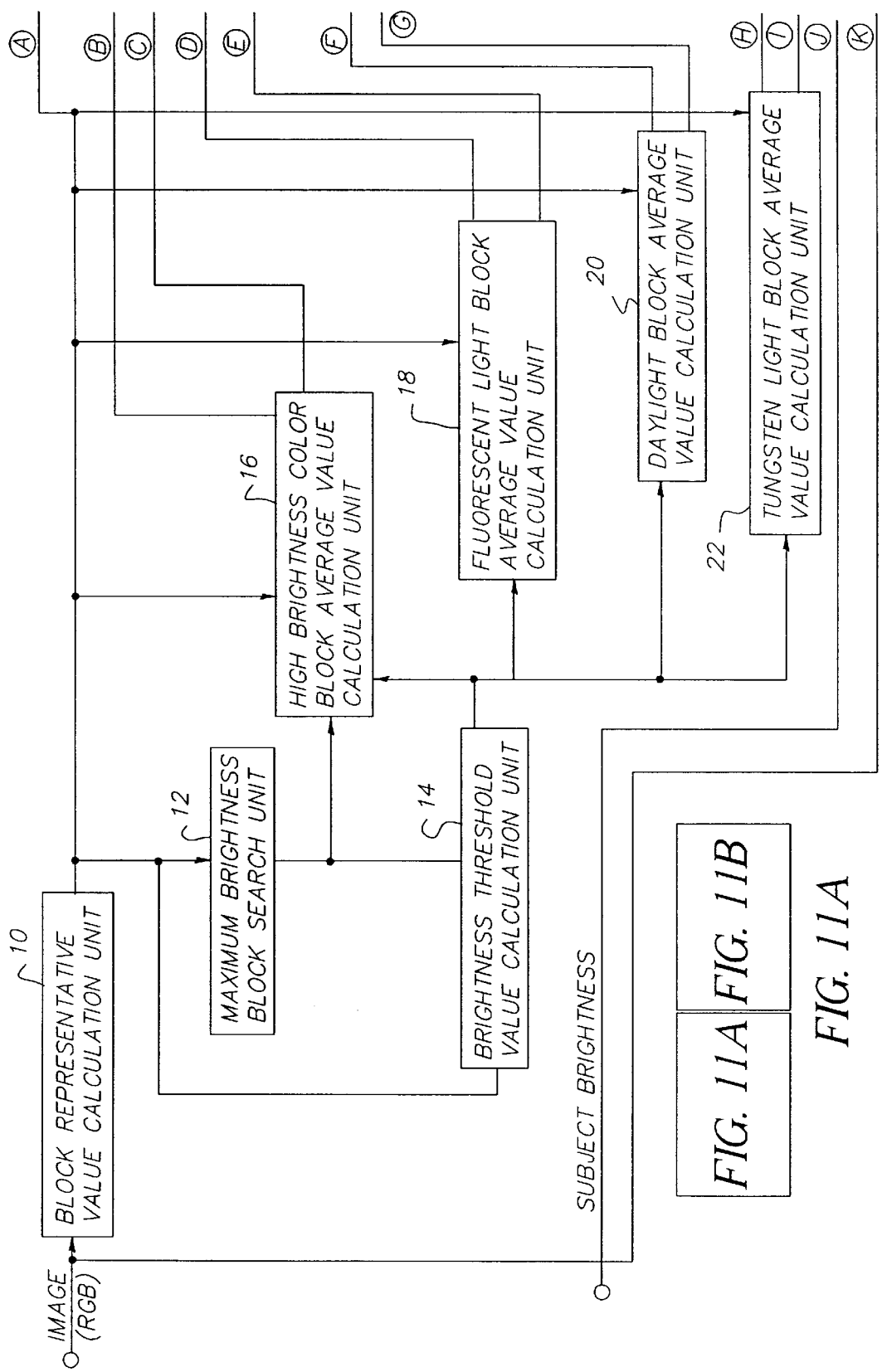
FIGS. 11A and 11B, taken together are a block diagram showing a configuration of the apparatus in accordance with another embodiment of the present invention.
Figure 11B:
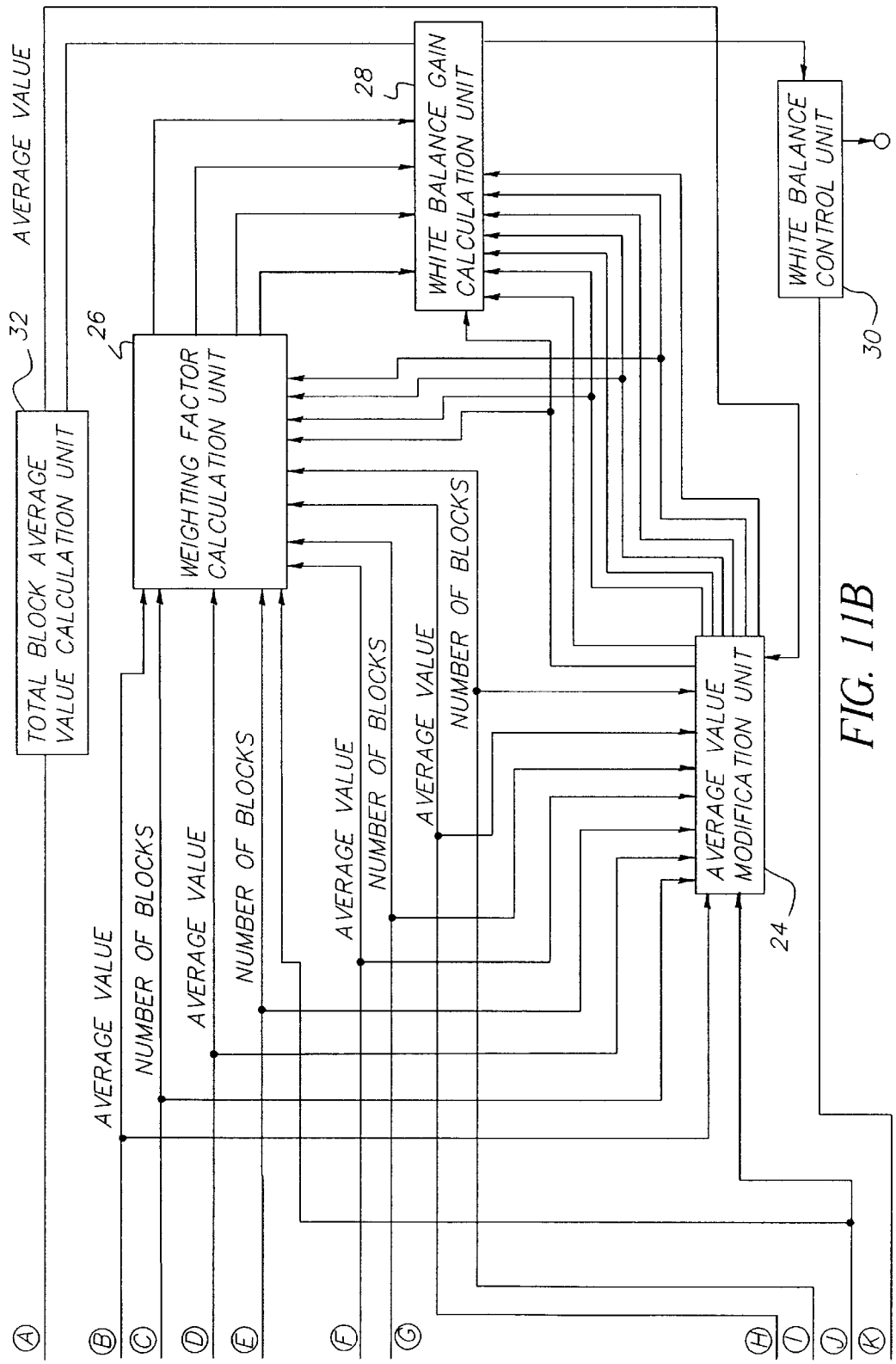

FIGS. 11A and B, taken together are a block diagram showing a configuration of the apparatus of this embodiment. This configuration comprises an all block average value calculation unit 32 in addition to the configuration of the embodiment 1 shown in FIGS. 1A and 1B. This apparatus differs from the apparatus of the embodiment 1 only in that the all block average value calculation unit 32 is additionally provided and in that in association therewith partial alterations lie in the calculation processing of the average value modification unit 24, the weighting factor calculation unit 26 and the white balance gain calculation unit 28. No description will therefore be made of the same parts as the embodiment 1.

The all block average value calculation unit 32 receives an input of a representative value ($T_l$, $T_g$, $T_i$) of each block of an image from the block representative value calculation unit 10, to determine an average value of all block representative values. The result of this is referred to as an all block average value ($T_{lAl}$, $T_{gAl}$, $T_{iAl}$).

The average value modification unit 24 performs modification processing of the all block average value and calculation of the block count $C_{ntAl}$ corresponding to the all block average value, in addition to the modification processing of each block average value which has been described above. Herein, the block count $C_{ntAl}$ corresponding to the all block average value is used to control the ratio of mixing (weighted averaging) with the other block average values upon the calculation of the white balance gain. Description is then be made of the content of processing effected by the average value modification unit 24, which is typical of this embodiment.

First, the average value modification unit 24 judges which light source among the fluorescent light, the sun and the tungsten light allows the color components ($T_{gAl}$, $T_{iAl}$) of the all block average value to come closest to the color of a white object under the illumination thereof. This judgment is made by setting three regions of a fluorescent light region, a daylight region and a tungsten light region on a color difference ($T_g$–$T_i$) plane in such a manner that they do not overlap one another and by determining which region contains the color components ($T_{gAl}$, $T_{iAl}$) of the all block average value.

The regions used herein are experimentally defined in advance in accordance with the following procedure. A plurality of scenes illuminated by only the fluorescent light are photographed to obtain a distribution of the all block average values of the scenes. The same experiment is applied to the daylight and the tungsten light as well. Then, the regions are defined so as to correspond to the distributions for the light sources and in such a manner that they do not overlap one another. It is to be appreciated that the regions for the light sources used in the calculation processing of the high brightness color block weighting factor could be used herein since the all block average value distribution often approximates to the high brightness color block average value distribution.

After the judgment of which light source allows the color difference components of the all block average value to come closest to the color of the white object under the illumination thereof, the all block average value is subjected to the average value modification similar to the average value modification processing for the light source which has been judged to allow the closest color difference components thereunder. Note herein that without performing the process of the weighted averaging with the standard value, the other average value modification processes are carried out.

Furthermore, the average value modification unit 24 determines a block count $C_{ntAl}$ corresponding to the all block average value, on the basis of the block count (any one of the fluorescent light block count $C_{ntFl}$, the daylight block count $C_{ntDy}$ and the tungsten light block count $C_{ntTu}$) for the light source judged to present the closest color difference components thereunder. $C_{ntAl}$ is determined by utilizing a function satisfying the condition that $C_{ntAl}$ increases accordingly as the block count (e.g., N) increases of the light source which has been judged to allow the closest color difference components thereunder and that conversely $C_{ntAl}$ decreases accordingly as N decreases. For example, $C_{ntAl}$ may be determined by using a linear function in the form of $$C_{ntAl} = a \times N + b \text{ (}a, b \text{ is a constant not less than 0).}$$

Unless the all block average value belongs to the fluorescent light region, the daylight region or the tungsten light region, then the all block average value is modified to a predetermined small value close to 0, with $C_{ntAl}$ being set to an extremely small number which has been defined in advance.

The above modification of the average value and decision of $C_{ntAl}$ are based on the following consideration.

It is envisaged that the all block average value is close to the average of colors of the entire image and that it is generally close to the color of the light source illuminating the scene. It can therefore be expected when the illumination environment is unchanged that the variation in the all block average value attendant on the change of scene will be less than the variation in the average value of the block corresponding to each light source such as the fluorescent light block. Thus, by allowing the all block average value to act on the white balance gain, it is possible to prevent the white balance gain from abruptly varying under the same illumination environment.

It is to be noted that the all block average value can not necessarily be close to the color of the illumination light source and that if a closeup of a red object is taken, the all block average value deviates toward red color and comes far from the color of the light source. That is, in case the color difference components ($T_{gAl}$, $T_{iAl}$) of the all block average value are not contained in the fluorescent light region, the daylight region and the tungsten light region, it is difficult to consider that the all block average value is close to the color of the light source, and hence it is unpreferred to allow the all block average value to act strongly on the white balance.

On the contrary, if the color difference components ($T_{gAl}$, $T_{iAl}$) of the all block average value are contained in the region of any one of the light sources, then a possibility that the scene is illuminated by that light source is strong to a certain extent. For this reason, in case the all block average value is contained in the region of any one of the light sources, the average value modification processing similar to that light source is carried out.

However, in this case also, the individual blocks may come far from the color of the light source although the all block average value is close to the color of that light source by chance. In that event, it is not preferred to allow the all block average value to strongly act on the white balance. Thus, for the purpose of controlling the degree of the influence of the all block average value on the white balance in response to whether the all block average value reflects the color of the light from the light source, this embodiment utilizes the block count $C_{ntAl}$ corresponding to the all block average value. In other words, the value of $C_{ntAl}$ is increased accordingly as it is judged with greater confidence that there is a strong possibility that the all block average value reflects the color of the light from the light source. The increase of $C_{ntAl}$ would allow an increase of the weight of the all block average value in the white balance gain. It can be judged from the block count associated with that light source whether or not there is a strong possibility that the all block average value reflects the color of the light from the light source. That is, if it is judged that the all block average value is close to the color of a light source and if the block count associated with that light source is large, it is considered that there is a strong possibility that the light source is one illuminating the scene. It is further envisaged that the possibility becomes stronger accordingly as the block count associated with that light source is larger. From the above consideration, this embodiment employed the method in which $C_{ntAl}$ is increased accordingly as there becomes larger the block count N associated with the light source judged to allow the closest approximation of the all block average value thereunder.

In case of using the expression (11) as the expression for calculating $C_{ntAl}$, the constants a and b can be determined with repeated trial and error from the results of photography of a multiplicity of scenes, in view of the trade-off between the white balance stability and the white balance properness (naturalness of the image color after the white balance processing). If the stability of the white balance is emphasized, the constants a and b are set to large values, whereas if the properness of the white balance is emphasized, the constants a and b are set to small values.

Then, the weighting factor calculation unit 26 figures out the weighting factor $W_{gtAl}$ for the all block average value in addition to the calculation of the weighting factor for each block average value described in the embodiment 1. The procedure is as follows.

It is first judged which region among the fluorescent light region, daylight region and tungsten light region contains color difference components ($T_{gAl}$, $T_{iAl}$) of the all block average value. Then, utilizing the method (see embodiment 1) of calculating the weighting factor for the light source corresponding to that region, the weighting factor $W_{gtAl}$ for the all block average value is figured out. For example, when ($T_{gAl}$, $T_{iAl}$) is contained in the fluorescent light region, the weighting factor $W_{gtAl}$ is determined by use of the same method as the case of the fluorescent light block weighting factor $W_{gtFl}$.

Then, the white balance gain calculation unit 28 figures out a white balance gain which reflects a modified all block average value ($T_{lalNew}$, $T_{gAlNew}$, $T_{iAlNew}$), a block count $C_{ntAl}$ and a weighting factor $W_{gtAl}$. The arithmetic expressions are given below by way of example.

$$Twc = WgtFl*CntFl + WgtTu*CntTu + WgtDy*CntDy + WgtBr*CntBr + WgtAl*CntAl \quad \text{[Expression 12]}$$

$$T1\text{Mix} = (WgtFl*T1Fl\text{New} + WgtTu*T1Tu\text{New} + WgtDy*T1Dy\text{New} + WgtBr*T1Br\text{New} + WgtAl*T1A1\text{New})/Twc$$

$$Tg\text{Mix} = (WgtFl*TgFl\text{New} + WgTu*TgTu\text{New} + WgtDy*TgDy\text{New} + WgtBr*TgBr\text{New} + WgtAl*TgA1\text{New})/Twc$$

$$Ti\text{Mix} = (WgtFl*TiFl\text{New} + WgtTu*TiTu\text{New} + WgtDy*TiDy\text{New} + WgtBr*TiBr\text{New} + WgtAl*TiA1\text{New})/Twc \quad \text{[Expression 13]}$$

$$\begin{pmatrix} R\text{Mix} \\ G\text{Mix} \\ B\text{Mix} \end{pmatrix} = \begin{pmatrix} 1 & -1 & -1 \\ 1 & 1 & 0 \\ 1 & -1 & 1 \end{pmatrix} \begin{pmatrix} Ti\text{Mix} \\ Tg\text{Mix} \\ Ti\text{Mix} \end{pmatrix} \quad \text{[Expression 14]}$$

$$\text{MaxMix} = \max(R\text{Mix}, G\text{Mix}, B\text{Mix}) \quad \text{[Expression 15]}$$

$$R\text{gain} = \text{MaxMix}/R\text{Mix}$$

$$G\text{gain} = \text{MaxMix}/G\text{Mix}$$

$$B\text{gain} = \text{MaxMix}/B\text{Mix} \quad \text{[Expression 16]}$$

According to this embodiment, as set forth hereinabove, the stability of the white balance gain can be improved by allowing the all block average value considered to be close to the color of the illumination light to act on the white balance gain. It is envisaged under the same illumination that the all block average value is not allowed to vary to a large extent depending on the change of the scene, thus preventing the white balance gain from sharply varying.

[Embodiment 7]

Typically, the scenes of shade or dark evening have high color temperatures (in other words, they are tinged with blue). Therefore, the images of such scenes need the white balancing to lower the color temperatures. On the contrary, the images of outdoor scenes in the bright daytime need little or substantially no correction of the color temperatures. The reason is because the colors in the daytime outdoors are reference colors for all colors.

One fact impedes the realization of good auto white balance in both the shade or dark evening scenes and the bright daytime scene. It is the fact that daytime blue sky also has a high color temperature similar to the scenes of shade or the like. In case of the execution of a simple white balancing based on the color temperatures (having a certain relation with the color difference components), the same white balance is imparted to both the scenes of shade or the like and the scenes containing much daytime blue sky. In this case, if the white balance level is controlled so as to eliminate the bluish tint of the scenes of the shade or the like, the white balancing will correct the daytime blue sky into a reddish sky.

This embodiment intends to solve such a problem. As a solution therefor, this embodiment dynamically varies the dimensions of the daylight region (see the embodiment 1) upon the extraction of the daylight blocks, in accordance with the subject brightness. More specifically, when the subject brightness is higher than a certain threshold value, it is envisaged that it is not the shade or the dark evening, with the result that the dimensions of the daylight region is reduced so as to exclude any possible high color temperature regions, for the purpose of preventing a malfunction of the white balancing attributable to the blue sky. This prevents the blocks containing much blue sky images from being selected as the daylight blocks, so that the information on the color of the blue sky having a high color temperature can not act on the white balance gain, to achieve the prevention of reddish correction of the sky blue. As opposed to this, when the subject brightness is lower than the certain threshold value, the daylight region is enlarged so as to contain regions having high color temperatures. This allows the high color temperature blocks in the shade or dark evening scenes to act on the white balance, making it possible to correct the levels of such color temperatures.

It is to be noted that the subject brightness threshold value for judging whether it is the shade/dark evening or not is previously defined by experiments.

[Embodiment 8]

In the above examples the light sources were assumedly the fluorescent light, the sun and the tungsten light. In the case of electronics still camera or the like, however, a strobe lamp is often used as the other light source. This embodiment aims at properness of the white balance upon the strobe lighting in the auto white balance apparatus of the embodiment 1.

The strobe lamp may simply be treated as a separate light source, similar to the fluorescent light, the sun, etc., although the processing tends to become complicated. Thus, this embodiment utilizes the fact that the color of the strobe light is fairly close to that of the daylight. More specifically, the daylight block average value and the daylight block count are corrected to acquire an average value and a block count for the strobe light, which are used for the calculation of the white balance gain to achieve a properness of the white balance in the case of the strobe lighting.

In this embodiment the auto white balance apparatus receives a signal indicative of whether a strobe device has issued a strobe light or not.

The correction of the daylight block average value, etc., upon the strobe lighting is carried out by the average value modification unit 24. When receiving a signal indicative of the strobe lighting, the average value modification unit 24 uses a previously defined strobe standard value in place of the daylight standard value to perform weighted averaging between the daylight block average value and the standard value. The arithmetic expression used at that time can be the expression (4). That is, with the strobe light standard value ($T_{gStdSt}$, $T_{iStdSt}$), the daylight block average value ($T_{gDy}$, $T_{iDy}$) is modified by use of $$T_{gDyNew} = A*T_{gDy} + B*T_{gStdSt}$$

$$T_{iDyNew} = A*T_{iDy} + B*T_{iStdSt}$$

It is preferable at that time to use the values for the strobe light with respect to not only the standard values but also to the factors A and B. In this case, the factor B is set to a value larger than the factor A to emphasize the strobe standard value. As a result of this, modification can be made which allows the daylight block average value to come closer to the color of the strobe light. According to such setting of the factors, the white balance can act on the strobe light more strongly.

Furthermore, upon the strobe lighting, the average value modification unit 24 adds a predetermined value to the daylight block count. Through this operation, a greater importance is attached to the daylight block average value (which in this case represents the influence of the strobe light) than to the fluorescent light block average value or to the tungsten light block average value.

Through such an operation, the apparatus of this embodiment realizes a white balance laying emphasis on the color of a strobe light when the strobe light has been emitted.

The strobe lamp fitted to a camera often has two modes, that is, automatic lighting mode and forced lighting mode. The former is the mode allowing the strobe lamp to emit a light in response to the subject brightness. The latter is the mode compulsorily causing the strobe lamp to issue a light in response to the operation of the shutter irrespective of the subject brightness. Thus, by changing the strobe light standard values, the factors A and B, and the value added to the daylight block count in the above operations depending on the strobe mode, a fine white balance can be achieved in response to the operation mode.

[Embodiment 9]

Although the above-described auto white balance apparatus has automatically performed the white balancing from the information on the images or on the subject brightness, such automatic processing has a limitation by itself. For example, under the fluorescent light illumination, there should be performed white balancing corresponding to the fluorescent light. However, if the object to be photographed is a deep red wall, it will be impossible to detect the fluorescent blocks from the images of that scene even though the object was put under the fluorescent light. It is therefore impossible in this case to provide the white balance for the fluorescent light by the above auto white balance processing.

In order to allow such a special case to be dealt with, the auto white balance apparatus is provided with a light source specification mode. For example, if it is previously known to use the fluorescent light illumination, then the user specifies the fluorescent light mode to perform the white balancing corresponding to ihe fluorescent light. The conventional light source specified white balancing presented a certain color correction regardless of the scene. However, various color temperatures exist even under the same fluorescent light illumination, so that such a uniform color correction could not provide a high quality of white balance.

Thus, this embodiment utilizes the mechanism of the auto white balance apparatus of the embodiment 1 to provide a method in which the white balance level can be controlled depending on the scene in spite of the light source specification mode.

In addition to the automatic mode for performing the white balance processing described in the embodiment, the auto white balance apparatus of this embodiment is provided with light source specification modes including the fluorescent light mode, the daylight mode and the tungsten light mode. Then, when any one of the light source specification modes is specified, the weighting factor calculation unit 26 sets the weighting factors for the light sources other than the specified light source to 0, with the output of only the weighting factor for the specified light source which has been figured out by the method set forth in the embodiment 1. The other processes are the same as described in the embodiment 1.

Such a configuration enables the auto white balance apparatus of the embodiment 1 to perform the white balance processing in the light source specification mode. Then, since this white balancing in the light source specification mode is carried out on the basis of the average values and weighting factors acquired from the images, it is possible to achieve a dynamic white balance control corresponding to individual scenes.

It will be appreciated that when weighted averaging the block average value for the specified light source and the standard value for that light source in the average value modification unit 24, the factor of the standard value may be set to be larger than the case of the automatic mode, whereby the block average value for that light source can come closer to the standard value, to achieve white balancing more suitable for that light source.

It is also preferable in this embodiment that the block average value calculation units 16 to 22 have default values of the block average values and block counts, which have been set for the case where the number of specified light sources is 0. Unless the image contains any blocks associated with the specified light source in the light source specification mode, the block average value calculation unit corresponding to the specified light source provides the default values as its block average value and the block count output so that the subsequent units can make calculation based on this information.

[Embodiment 10]

In the event that a continuous shooting is performed in the same illumination environment by use of a video camera or the like, a slight variation in the composition may possibly cause a subtle variation in the white balance gain. Such a case, even though the variation itself were minute, a variation in the tone of the image attributable thereto would often be noticeable.

In view of such a problem, this embodiment provides a structure for lessening variations in the white balance gain between continuous images in case the continuous shooting is considered to be made under the same illumination environment.

The apparatus of this embodiment can have the same basic configuration as that of the embodiment 1 except that the white balance gain calculation unit 28 additionally includes the following function.

That is, the white balance gain calculation unit 28 is provided with a history storage unit for holding histories of white balance gains about the past images. The history storage unit stores therein the white balance gains which have been figured out for images input in sequence. However, when it is judged that the illumination environment has changed, there are cleared the white balance gains which have been stored so far.

The white balance gain calculation unit 28 figures out a white balance gain for the input image in accordance with the procedure described in the embodiment 1 and thereafter compares the value of the gain with the white balance gain for the most recent frame image stored in the history storage unit. If as a result of the comparison the difference between the two is small, then it is judged that a continuous shooting is performed under the same illumination, and the averaging is made between the current white balance gain and the past white balance gains stored in the history storage. The result is provided as its output. Herein, with respect to the current image and the most recent image, it is judged that the difference in gain is small if all of differences between respective absolute values of gains about R, G and B are smaller than the predetermined threshold values. Otherwise, it is judged that the difference in gain is large. As an alternative, it may be judged that the difference in gain is small if sum squares of gains about R, G and B are smaller respectively than the predetermined threshold values. Furthermore, suitable for the averaging process is for example a weighted averaging process in which a higher weight is imparted to more recent frame gains. Note that the thus obtained gain is stored in the history storage unit in addition to the gains which have hitherto been stored.

By virtue of such a configuration, in case it is judged that the current image and the past images are under the same illumination environment, the white balance gains are smoothed using the past value, with the result that it is possible to suppress a rapid variation in the white balance gain and hence a rapid change of the tone of the images.

It is to be appreciated that if the difference in white balance gain between the current image and the most recent image is large, then the white balance gain calculation unit 28 provides intactly as its output the white balance gain which has been figured out for the current image. Then, the past white balance gains stored in the history storage unit are cleared so that the output white balance gain is newly stored.

[Embodiment 11]

The apparatus of the embodiment 1 extracted blocks close to colors of white objects under the light sources from images and determined white balance gains from the colors of those blocks. However, some scenes may contain few or substantially no blocks corresponding to any light sources. For example, it is envisaged that in an image representing a deep red wall there will exist none or substantially none of the fluorescent light blocks, daylight blocks and tungsten blocks independent of whether the light source illuminating it is the fluorescent light or the sun. The white balance gain acquired from such an image is apt to have a low reliability. That is, since the image could not provide much information on the color of the light source, the white balance gain acquired from such an image will have a less possibility ensuring a proper correction of the color of the light source. It can therefore be said that such a scene is essentially unsuitable for the automatic white balancing.

This embodiment aims to provide a structure ensuring good white balancing to some extent even in such a case in the auto white balance apparatus of the embodiment 1.

In the event of the apparatus of the embodiment 1, it is envisaged that if the block count (e.g., the fluorescent light block count) associated with a light source is extremely small, there is a less possibility that the scene is illuminated by that light source. Furthermore, the apparatus of the embodiment 1 is configured such that even though the block count associated with a light source is large to a certain extent, if there is a less possibility of being illuminated by that light source, the value of the weighting factor about that light source acquired by the weighting factor calculation unit 26 becomes smaller. In the case of an image obtained by photographing green trees in the bright outdoors for example, blocks of the green portions may possibly be judged to be the fluorescent light blocks, with the result that the fluorescent light block count may increase. In this case, the fluorescent light block weighting factor results in an extremely small value due to the high subject brightness. It can thus been seen that there is a less possibility of being illuminated by the fluorescent light.

From such a consideration, this embodiment determines the degree of possibility that the scene is illuminated by a light source, on the basis of the block count and weighting factor associated with that light source. Then, if this possibility is poor for all the light sources, it is judged that the white balance gain obtained at that time has a low reliability.

It is preferable to use, as an index value indicative of the possibility of being illuminated by a light source, the product of the block count and weighting factor associated with that light source. If both the block count and weighting factor associated with a light source are small, then the production of the two becomes extremely small, although it is envisaged in such a case that there is also a still less possibility of being illuminated by that light source. The processing includes defining a small threshold value for the value of the product in advance; finding the product of the block count and weighting factor for each light source for the comparison with that threshold value; and judging, if the product is smaller than the threshold value for all the light sources, that the white balance gain obtained for an image at that time has a low reliability. It will be appreciated that this method is merely an example and that there could naturally be used other index value consisting of the block count and the weighting factor which have otherwise been combined.

The white balance gain calculation unit 28 is provided with a storage unit for storing therein white balance gain which have been determined before. In case no judgment has been made that the determined white balance gain has a low reliability, the white balance gain calculation unit 28 places the gain into the storage unit. Then, if it has been judged that a white balance gain obtained sometime has a low reliability, weighted averaging is made between the white balance gain and the most recent white balance gain held in the storage unit with previously defined weighting. The result is output as a final white balance gain.

According to such a configuration, a relatively good white balance can be achieved even in the case of a scene to which it is difficult to apply the automatic white balancing, by utilizing the information on the past white balance gains.

The preferred embodiments of the present invention have been described in greater detail hereinabove. Although the above description has been made of the case where the image signals are RGB signals by way of example, it will be apparent from the above description that the present invention is applicable similarly to other types of image signals than the RGB signals and that the same effects can be achieved.

Furthermore, although the above embodiments have employed the white balance control signals in the form of gain (white balance gain) for image signals, the present invention is applicable similarly to other form of white balance control signals, which case will also ensure the same effect.

What is claimed is:

1. An auto white balance apparatus comprising:

block split means for splitting an input image into a plurality of blocks;

representative value calculation means for determining, for each split block, a representative value containing a brightness and a color difference representative of each block on the basis of color values of pixels lying within each block;

maximum brightness block search means for finding a maximum brightness block among said plurality of blocks on the basis of said representative values of said blocks;

brightness threshold value calculation means for determining a brightness threshold value on the basis of the brightness contained in said representative value of each block;

high brightness color block average value calculation means for defining a high brightness region as a region indicative of a color analogous to said representative value of said maximum brightness block in a color space on the basis of said representative value of said maximum brightness block, to extract blocks having representative values contained in said high brightness region as high brightness color blocks from blocks having a higher brightness than said brightness threshold value among said plurality of blocks, to thereby determine an average value of representative values of said high brightness color blocks thus extracted, wherein in the calculation of said average value of said block representative values, a larger weight is imparted to representative values of blocks closer to the center of a picture, to obtain an average value;

light source block average value calculation means provided for each of a plurality of light sources, for extracting blocks having representative values contained in an associated light source region defined as a region indicative of the color of a white object under each associated light source in said color space, as light source blocks corresponding to each associated light source, from blocks having a higher brightness than said brightness threshold value among said plurality of blocks, thereby determining an average value of representative values of associated said light source blocks thus extracted, wherein in the calculation of said average value of said block representative values, a larger weight is imparted to representative values of blocks closer to the center of a picture, to obtain an average value;

white balance control signal calculation means for determining a white balance control signal on the basis of an average value of representative values of said high brightness color blocks and an average value of representative values of said light source blocks for each light source; and white balance means for providing a white balance control for each pixel of said input image by use of said white balance control signal acquired by said white balance control signal calculation means.

2. The apparatus according to claim 1, wherein said brightness threshold value is determined on the basis of the brightness of said maximum brightness block and the average brightness of all said blocks.

3. The apparatus according to claim 1, wherein each said white balance control signal calculation means include first modification means for modifying an average value of representative values of blocks associated with each light source by use of a standard value previously defined for each light source, said white balance control signal calculation means determining said white balance control signal by using said average value modified by said first modification means.

4. The apparatus according to claim 3, further including means for receiving a signal which provides a notice of strobe light emission, and wherein when said signal receiving means receives said notice of strobe light emission, said first modification means modify an average value of representative values of said light source blocks assuming the sun as the light source, by using a previously defined strobe standard value in lieu of a standard value defined for the daylight.

5. The apparatus according to claim 1 further comprising means for detecting the brightness of a subject, and wherein each said white balance control signal calculation means include second modification means for modifying an average value of representative values of said light source blocks associated with a light source of a type used as an indoor light source, with a weight which becomes smaller accordingly as the subject brightness is higher, said white balance control signal calculation means determining said white balance control signal by use of said average value modified by said second modification means.

6. The apparatus according to claim 1, wherein said block representative values are figured out by use of values of pixels except saturated pixels among pixels constituting associated blocks.

7. The apparatus according to claim 1, wherein said average value of said block representative values of said high brightness color blocks is determined from representative values of blocks other than blocks containing the number of saturated pixels exceeding a predetermined reference value.

8. The apparatus according to claim 1, wherein if a difference between the value of a predetermined pixel within a block and the representative value of said high brightness color block exceeds a predetermined value, said representative value of said block is reduced to a predetermined ratio in the calculation of said average value of said block representative values.

9. The apparatus according to claim 1, further including all block average value calculation means for determining an all block average value which is obtained by averaging representative values of all blocks of an input image, and wherein said white balance control signal calculation means determine said white balance control signal taking into consideration said all block average value as well.

10. The apparatus according to claim 9, wherein if said all block average value does not belong to any light source regions, said all block average value is modified to a predetermined small value, to be used for the calculation of said white balance control signal.

11. The apparatus according to claim 1, further including means for detecting the brightness of a subject, and daylight block average value calculation means assuming the sun as a light source, said daylight block average value calculation means being one of said light source block average value calculation means, and wherein said daylight block average value calculation means reduce the dimensions of said light source region associated with daylight so as to exclude a high color temperature portion if said subject brightness is higher than a predetermined threshold value, said daylight block average value calculation means increasing the dimensions of said light source region associated with the daylight so as to contain said high color temperature portion if said subject brightness is lower than said predetermined threshold value.

12. The apparatus according to claim 1, further comprising a light source specification mode in which said white balance is achieved in view of only a specified light source, and wherein said white balance control signal calculation means in said light source specification mode determine said white balance control signal on the basis of only the average value of light source blocks associated with said specified light source.

13. The apparatus according to claim 1, wherein further including:

judging means for judging whether the illumination environment has changed between the present time and most recent time on the basis of comparison between a white balance signal acquired from an input image and a white balance signal of the most recent image; and storage means for storing acquired white balance control signals for the duration in which judgment is made that there is no change in the illumination environment; and wherein when said judgment means have judged that there is no change in the illumination environment, said white balance control signal calculation means correct said white balance control signal acquired from said input image by the use of said white balance control signals stored in said storage means and then provide said connected white balance control signal as output to said white balance means.

14. The apparatus according to claim 1, wherein said white balance control signal calculation means determine, for all previously assumed light sources, an index value indicative of a possibility that each light source is an illumination light source on the basis of each associated light source block count, and wherein if said index value is smaller than a predetermined threshold value for said all previously assumed light sources, said white balance control signal calculation means judge that said white balance control signal acquired from said input image has a low reliability, to correct said white balance control signal by use of a white balance signal which was acquired before and which has been judged to have a high reliability, to provide it as output to said white balance means.

15. An auto white balance apparatus comprising:

block split means for splitting an input image into a plurality of blocks;

representative value calculation means for determining, for each split block, a representative value containing a brightness and a color difference representative of each block on the basis of color values of pixels lying within each block;

maximum brightness block search means for finding a maximum brightness block among said plurality of blocks on the basis of said representative values of said blocks;

brightness threshold value calculation means for determining a brightness threshold value on the basis of the brightness contained in said representative value of each block;

high brightness color block average value calculation means for defining a high brightness region as a region indicative of a color analogous to said representative value of said maximum brightness block in a color space on the basis of said representative value of said maximum brightness block, to extract blocks having representative values contained in said high brightness region as high brightness color blocks from blocks having a higher brightness than said brightness threshold value among said plurality of blocks, to thereby determine an average value of representative values of said high brightness color blocks thus extracted, wherein in the calculation of said average value of said block representative values, a larger weight is imparted to representative values of blocks closer to the center of a picture, to obtain an average value;

white balance control signal calculation means for determining a white balance control signal on the basis of said average value of representative values of said high brightness color blocks; and white balance means for providing a white balance control for each pixel of said input image by use of said white balance control signal acquired by said white balance control signal calculation means.

16. An auto white balance apparatus comprising:

block split means for splitting an input image into a plurality of blocks;

representative value calculation means for determining, for each split block, a representative value containing a brightness and a color difference representative of each block on the basis of color values of pixels lying within each block;

maximum brightness block search means for finding a maximum brightness block among said plurality of blocks on the basis of said representative values of said blocks;

brightness threshold value calculation means for determining a brightness threshold value on the basis of the brightness contained in said representative value of each block;

light source block average value calculation means provided for each of a plurality of light sources, for extracting blocks having representative values contained in an associated light source region defined as a region indicative of the color of a white object under each associated light source in a color space, as light source blocks corresponding to each associated light source, from blocks having a higher brightness than said brightness threshold value among said plurality of blocks, thereby determining an average value of representative values of associated said light source blocks thus extracted, wherein in the calculation of said average value of said block representative values, a larger weight is imparted to representative values of blocks closer to the center of a picture, to obtain an average value;

white balance control signal calculation means for determining a white balance control signal on the basis of said average value of representative values of said light source blocks for each light source; and white balance means for providing a white balance control for each pixel of said input image by use of said white balance control signal acquired by said white balance control signal calculation means.

17. An auto white balance apparatus comprising:

block split means for splitting an input image into a plurality of blocks;

representative value calculation means for determining, for each split block, a representative value containing a brightness and a color difference representative of each block on the basis of color values of pixels lying within each block;

maximum brightness block search means for finding a maximum brightness block among said plurality of blocks on the basis of said representative values of said blocks;

brightness threshold value calculation means for determining a brightness threshold value on the basis of the brightness contained in said representative value of each block;

high brightness color block average value calculation means for defining a high brightness region as a region indicative of a color analogous to said representative value of said maximum brightness block in a color space on the basis of said representative value of said maximum brightness block, to extract blocks having representative values contained in said high brightness region as high brightness color blocks from blocks having a higher brightness than said brightness threshold value among said plurality of blocks, to thereby determine an average value of representative values of said high brightness color blocks thus extracted, wherein if a difference between the value of a predetermined pixel within a block and the representative value of said block exceeds a predetermined value, said representative value of said block is reduced to a predetermined ratio in the calculation of said average value of said block representative values;

white balance control signal calculation means for determining a white balance control signal on the basis of said average value of representative values of said high brightness color blocks; and white balance means for providing a white balance control for each pixel of said input image by use of said white balance control signal acquired by said white balance control signal calculation means.

18. An auto white balance apparatus comprising:

block split means for splitting an input image into a plurality of blocks;

representative value calculation means for determining, for each split block, a representative value containing a brightness and a color difference representative of each block on the basis of color values of pixels lying within each block;

maximum brightness block search means for finding a maximum brightness block among said plurality of blocks on the basis of said representative values of said blocks;

brightness threshold value calculation means for determining a brightness threshold value on the basis of the brightness contained in said representative value of each block;

light source block average value calculation means provided for each of a plurality of light sources, for extracting blocks having representative values contained in an associated light source region defined as a region indicative of the color of a white object under each associated light source in a color space, as light source blocks corresponding to each associated light source, from blocks having a higher brightness than said brightness threshold value among said plurality of blocks, thereby determining an average value of representative values of associated said light source blocks thus extracted, wherein if a difference between the value of a predetermined pixel within a block and the representative value of said block exceeds a predetermined value, said representative value of said block is reduced to a predetermined ratio in the calculation of said average value of said block representative values;

white balance control signal calculation means for determining a white balance control signal on the basis of said average value of representative values of said light source blocks for each light source; and white balance means for providing a white balance control for each pixel of said input image by use of said white balance control signal acquired by said white balance control signal calculation means.

19. An auto white balance apparatus comprising:

block split means for splitting an input image into a plurality of blocks;

representative value calculation means for determining, for each split block, a representative value containing a brightness and a color difference representative of each block on the basis of color values of pixels lying within each block;

maximum brightness block search means for finding a maximum brightness block among said plurality of blocks on the basis of said representative values of said blocks;

brightness threshold value calculation means for determining a brightness threshold value on the basis of the brightness contained in said representative value of each block;

high brightness color block average value calculation means for defining a high brightness region as a region indicative of a color analogous to said representative value of said maximum brightness block in a color space on the basis of said representative value of said maximum brightness block, to extract blocks having representative values contained in said high brightness region as high brightness color blocks from blocks having a higher brightness than said brightness threshold value among said plurality of blocks, to thereby determine an average value of representative values of said high brightness color blocks thus extracted, wherein said average value of said block representative values is determined from representative values of blocks other than blocks containing the number of saturated pixels exceeding a predetermined reference value;

white balance control signal calculation means for determining a white balance control signal on the basis of said average value of representative values of said high brightness color blocks; and white balance means for providing a white balance control for each pixel of said input image by use of said white balance control signal acquired by said white balance control signal calculation means.

20. An auto white balance apparatus comprising:

block split means for splitting an input image into a plurality of blocks;

representative value calculation means for determining, for each split block, a representative value containing a brightness and a color difference representative of each block on the basis of color values of pixels lying within each block;

maximum brightness block search means for finding a maximum brightness block among said plurality of blocks on the basis of said representative values of said blocks;

brightness threshold value calculation means for determining a brightness threshold value on the basis of the brightness contained in said representative value of each block;

light source block average value calculation means provided for each of a plurality of light sources, for extracting blocks having representative values contained in an associated light source region defined as a region indicative of the color of a white object under each associated light source in a color space, as light source blocks corresponding to each associated light source, from blocks having a higher brightness than said brightness threshold value among said plurality of blocks, thereby determining an average value of representative values of associated said light source blocks thus extracted, wherein said average value of said block representative values is determined from representative values of blocks other than blocks containing the number of saturated pixels exceeding a predetermined reference value;

white balance control signal calculation means for determining a white balance control signal on the basis of an average value of representative values of said light source blocks for each light source; and white balance means for providing a white balance control for each pixel of said input image by use of said white balance control signal acquired by said white balance control signal calculation means.

\* \* \* \* \*